United States Patent [19]
Scott

[11] Patent Number: 5,832,022
[45] Date of Patent: Nov. 3, 1998

[54] METHOD AND APPARATUS FOR CONTROLLING THE MODULATION INDEX OF CONTINUOUS PHASE MODULATED (CPM) SIGNALS

[75] Inventor: Logan Scott, Breckenridge, Colo.

[73] Assignee: Omnipoint Corporation, Colorado Springs, Colo.

[21] Appl. No.: 459,326

[22] Filed: Jun. 2, 1995

[51] Int. Cl.$^6$ .......................... H04L 27/30; H04L 25/03; H04L 25/49

[52] U.S. Cl. .......................... 375/200; 375/297; 375/305; 455/44; 332/106

[58] Field of Search ................................... 375/200–210, 375/271, 272, 295, 296, 297, 274, 305, 336; 455/42, 43, 44; 332/100, 106, 107

[56] References Cited

U.S. PATENT DOCUMENTS

| | | | |
|---|---|---|---|
| 4,100,498 | 7/1978 | Alsup et al. | 328/14 |
| 4,163,944 | 8/1979 | Chambers et al. | 325/446 |
| 4,285,060 | 8/1981 | Cobb et al. | 375/1 |
| 4,291,410 | 9/1981 | Caples | 375/1 |
| 4,324,001 | 4/1982 | Rhodes | 375/90 |
| 4,327,438 | 4/1982 | Baier et al. | 375/1 |
| 4,338,579 | 7/1982 | Rhodes | 332/21 |
| 4,339,724 | 7/1982 | Feher | 328/164 |
| 4,355,399 | 10/1982 | Timor | 375/80 |
| 4,435,821 | 3/1984 | Ito et al. | 375/1 |
| 4,455,651 | 6/1984 | Baran | 370/104 |
| 4,479,227 | 10/1984 | Bjornholt | 375/1 |
| 4,481,640 | 11/1984 | Chow et al. | 375/1 |
| 4,517,679 | 5/1985 | Clark et al. | 375/37 |

(List continued on next page.)

FOREIGN PATENT DOCUMENTS

| | | | |
|---|---|---|---|
| 9318596 | 9/1993 | WIPO | H04J 3/16 |
| 9503652 | 2/1995 | WIPO | H04B 7/26 |
| 9512938 | 5/1995 | WIPO | H04J 13/00 |

OTHER PUBLICATIONS

Proakis, "Digital communications", by McGraw–Hill, Inc., pp. 173–186, 1989.

Smith, W. Richard, "SAW Filters For CPSM Spread Spectrum Communication", *IEEE National Telecommunications Conference*, pp. 22.1.1–22.1.6. Nov. 1980.

El–Tanany, Mohammed et al., *Analysis of Two Loops for Carrier Recovery in CPM with Index 1/2*, IEEE Transactions on Communications, 37(2):164–176, Feb. 1989.

(List continued on next page.)

*Primary Examiner*—Stephen Chin
*Assistant Examiner*—Hai H. Phan
*Attorney, Agent, or Firm*—Lyon & Lyon LLP

[57] ABSTRACT

A transceiver uses feedback control to monitor a transmitted continuous phase modulation (CPM) waveform, such as a spread spectrum CPM waveform, and adjust the modulation index in response thereto. Codewords are selected from a table according to a data signal and applied to a pulse shaping network. The pulse shaping network outputs a CPM waveform to a prefilter. The prefilter is connected to an FM modulator, such as a voltage controlled oscillator. In one embodiment, a correlator in the transceiver monitors the transmitted waveform during times when the transceiver is not receiving signals, and provides a correlation signal to a feedback control circuit. The feedback control circuit dynamically adjusts the gain of the prefilter, and may comprise, e.g., a second order tracking loop filter. The feedback control signal thereby tracks the amplitude of the transmitted waveform and adjusts the output gain of the prefilter so as to maintain a constant signal envelope. A tau-dither algorithm may be employed as part of the tracking circuit. In an alternative embodiment, a gradient search is used to adjust the output amplitude of the transmitted signal, wherein the step size of the gradient search is based on the slope of the signal amplitude and varied dynamically over time. In another embodiment, a two bandwidth differencing circuit is used to adjust the output amplitude of the transmitted signal.

51 Claims, 24 Drawing Sheets

U.S. PATENT DOCUMENTS

| | | | |
|---|---|---|---|
| 4,527,275 | 7/1985 | Russell | 375/1 |
| 4,567,602 | 1/1986 | Kato et al. | 375/1 |
| 4,583,048 | 4/1986 | Gumacos et al. | 329/122 |
| 4,587,662 | 5/1986 | Langewellpott | 375/1 |
| 4,606,039 | 8/1986 | Nicolas et al. | 375/1 |
| 4,641,317 | 2/1987 | Fullerton | 375/1 |
| 4,644,565 | 2/1987 | Seo et al. | 375/60 |
| 4,648,098 | 3/1987 | Kerr | 375/47 |
| 4,648,099 | 3/1987 | Kerr et al. | 375/47 |
| 4,684,488 | 8/1987 | Chung et al. | 375/47 |
| 4,688,210 | 8/1987 | Eizenhofer et al. | 370/18 |
| 4,707,839 | 11/1987 | Andren et al. | 375/1 |
| 4,745,628 | 5/1988 | McDavid et al. | 375/39 |
| 4,774,715 | 9/1988 | Mesenger | 375/1 |
| 4,815,106 | 3/1989 | Propp et al. | 375/36 |
| 4,979,186 | 12/1990 | Fullerton | 375/23 |
| 4,984,247 | 1/1991 | Kaufmann et al. | 375/1 |
| 5,008,925 | 4/1991 | Pireh | 379/60 |
| 5,016,255 | 5/1991 | Dixon et al. | 375/1 |
| 5,022,047 | 6/1991 | Dixon et al. | 375/1 |
| 5,025,452 | 6/1991 | Sohner et al. | 375/1 |
| 5,029,184 | 7/1991 | Andren et al. | 375/1 |
| 5,066,957 | 11/1991 | Mizuno et al. | 342/352 |
| 5,081,652 | 1/1992 | O'Clock et al. | 375/1 |
| 5,093,637 | 3/1992 | Isota et al. | 332/103 |
| 5,093,840 | 3/1992 | Schilling | 375/1 |
| 5,107,225 | 4/1992 | Wheatley et al. | 330/279 |
| 5,150,377 | 9/1992 | Vannucci | 375/1 |
| 5,177,765 | 1/1993 | Holland et al. | 375/1 |
| 5,177,766 | 1/1993 | Holland t al. | 375/1 |
| 5,191,597 | 3/1993 | Ekelund et al. | 375/60 |
| 5,222,099 | 6/1993 | Hori et al. | 375/1 |
| 5,228,053 | 7/1993 | Miller et al. | 375/1 |
| 5,228,056 | 7/1993 | Schilling | 375/1 |
| 5,255,288 | 10/1993 | Ichihara | 375/64 |
| 5,276,705 | 1/1994 | Higgins et al. | 375/1 |
| 5,299,226 | 3/1994 | Schilling | 375/1 |
| 5,313,457 | 5/1994 | Hostetter et al. | 370/18 |
| 5,341,396 | 8/1994 | Higgins et al. | 375/1 |
| 5,347,284 | 9/1994 | Volpi et al. | 342/356 |
| 5,383,219 | 1/1995 | Wheatley et al. | 375/1 |
| 5,414,728 | 5/1995 | Zevahi | 375/200 |
| 5,438,329 | 8/1995 | Gastouniotis et al. | 340/870.02 |
| 5,442,662 | 8/1995 | Fukusawa et al. | 375/205 |

OTHER PUBLICATIONS

Rohling, Hermann et al., *Mismatched–Filter Design for Periodical Binary Phased Signals*, IEEE Trnasactions On Aerospace and Electronic System, 25(6):890–897, Nov. 1989.

Kavehard, M. et al., *Spread Spectrum for Indoor Digital Radio*, IEEE Communications Magazine, Jun. 1987, vol. 25, No. 5, at 32–40.

Nanayakkara, S., *High Speed Receiver Designs Based on Surface Acoustic Wave Devices*, Sixth International Conference on Digital Statellite Communications, Sep. 1983, pp. 16–22.

Collins, J.H. et al., *The Role of Surface Acoustic Wave Technology in Communication Systems*, Ultrasonics, Mar. 1972, vol. 10, No. 2, pp. 59–71.

Dixon, Robert C., *Spread Spectrum Systems With Commercial Applications* (J. Wiley & Sons, 3d ed. 1994).

Amoroso, Frank et al., *Simplified MSK Signaling Technique*, IEEE Transactions on Communications, Apr. 1977, pp. 433–441.

Austin, Mark C. et al., *Quadrature Overlapped Raised–Cosine Modulation*, IEEE Transactions on Communications, vol. Com–29, No. 3, Mar. 1981, pp. 237–249.

Murota, Kazuaki et al., *GMSK Modulation for Digital Mobile Radio Telephony*, IEEE Transactions on Communications, vol. Com–29, No. 7, Jul. 1981, pp. 1044–1050.

Seo, J.S. et al., *SQAM: A New Superposed QAM Modem Technique*, IEEE Transactions on Communications, vol. Com–33, Mar. 1985, pp. 296–300.

Vale, Christopher R., *SAW Quadraphase Code Generator*, IEEE Transactions On Microwave Theory and Techniquest, vol. MTT–29, No. 5, May 1981, pp. 410–414.

Taylor, John W., Jr. et al., *Quadriphase Code–A Radar Pulse Compression Signal With Unique Characteristics*, IEEE Transactions on Aerospace and Electronic Systems, vol. 24, No. 2, Mar. 1988, pp. 156–170.

Ziemer, Rodger et al., *Conversion and Matched Filter Approximations for Serial Minimun–Shift Keyed Modulation*, IEEE Transactions on Communications, vol. Com. 30, No. 3, Mar. 1982, pp. 495–509.

Unkauf, Manfred G., *Surface Wave Devices in Spread Spectrum Systems*, Surface Wave Filters (Wiley 1977), pp. 477–509.

Cohen, Marvin N. et al., *Minimum Peak Sidelobe Pulse Compression Codes*, IEE International Radar Conference, 1990, pp. 633–638.

Campbell, Colin K., *Applications of Surface Acoustice and Shallow Bulk Acoustic Wave Devices*, Proceedings of the IEEE, Oct. 1989, pp. 1453–1484.

Anderson, John B. et al., *Digital Phase Modulation*, (Plenum Press, 1986), pp. 22–26.

Anderson, John B. et al., *Digital Phase Modulation*, (Plenum Press, 1986), pp. 50–53.

Anderson, John B. et al., *Digital Phase Modulation*, (Plenum Press, 1986), Chapter 6, pp. 211–235.

Anderson, John B. et al., *Digital Phase Modulation*, (Plenum Press, 1986), Chapter 7, pp. 237–271.

de Jager, Frank et al., *Tamed Frequency Modulation, A Novel Method to Achieve Spectrum in Digital Transmission*, IEEE Transactions on Communications, vol. Com–26, No. 5, May 1978, pp. 534–541.

Leung, Patrick S.K. et al., *F–QPSK—A Superior Modulation Technique for Mobile and Personal Communications*, IEEE Transactions on Broadcasting, vol. 39, No. 2, Jun. 1993, pp. 288–294.

Dixon, Robert C., *Spread Spectrum Systems*, (J. Wiley & Sons, 2d ed. 1984).

"Filtering and Limiting Effects on The Performance of QPSK, OKQPSK, MSK and Feher's QPSK", Section 4.9, *Power Efficient Modulation Techniques For Satellite Channels*, Chap. 4, pp. 196–200.

Austin, Mark C. et al., *QPSK, Staggered QPSK, and MSK—A Comparative Evaluation*, IEEE Transactions on Communications, vol. Com–31, No. 2, Feb. 1983, pp. 171–182.

Chung, K.S. et al., *Generalized Tamed Frequency Modulation*, IEEE, 1982, pp. 1805–1808.

Kato, Shuzo et al., *XPSK: A New Cross–Correlated Phase–Shift Keying Modulation Technique*, IEEE Transactions on Communications, vol. Com–31, No. 5, May 1983, pp. 701–707.

Feher, Kamilo, *JTC Modulation Standard Group–FOPSK Consortium—Spectrum utilization with compatible/expandable GMSK, OPSK and FOPSK*, JTC: Joint Technical Committee On Wireless Access, Feb. 1994.

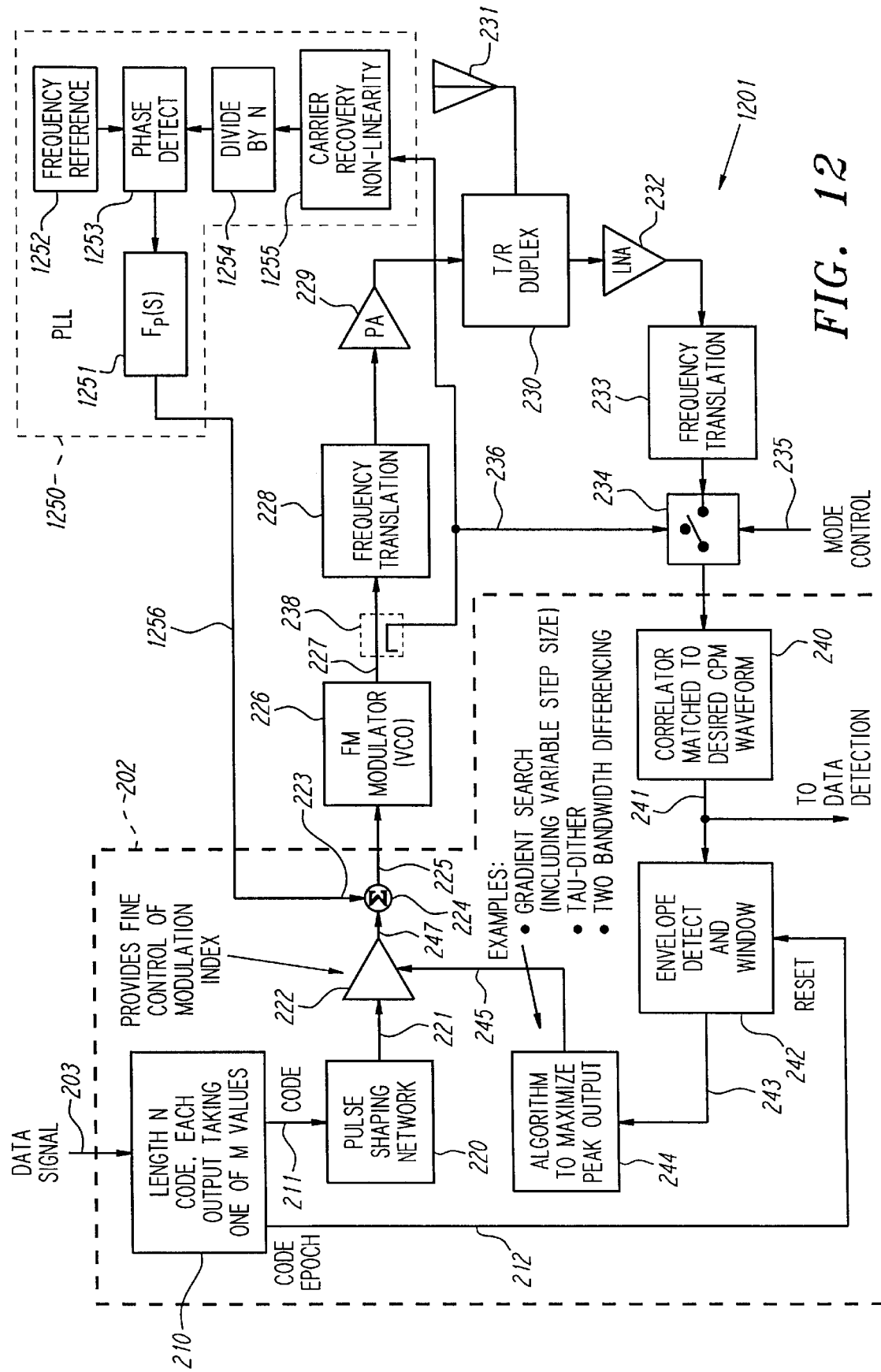

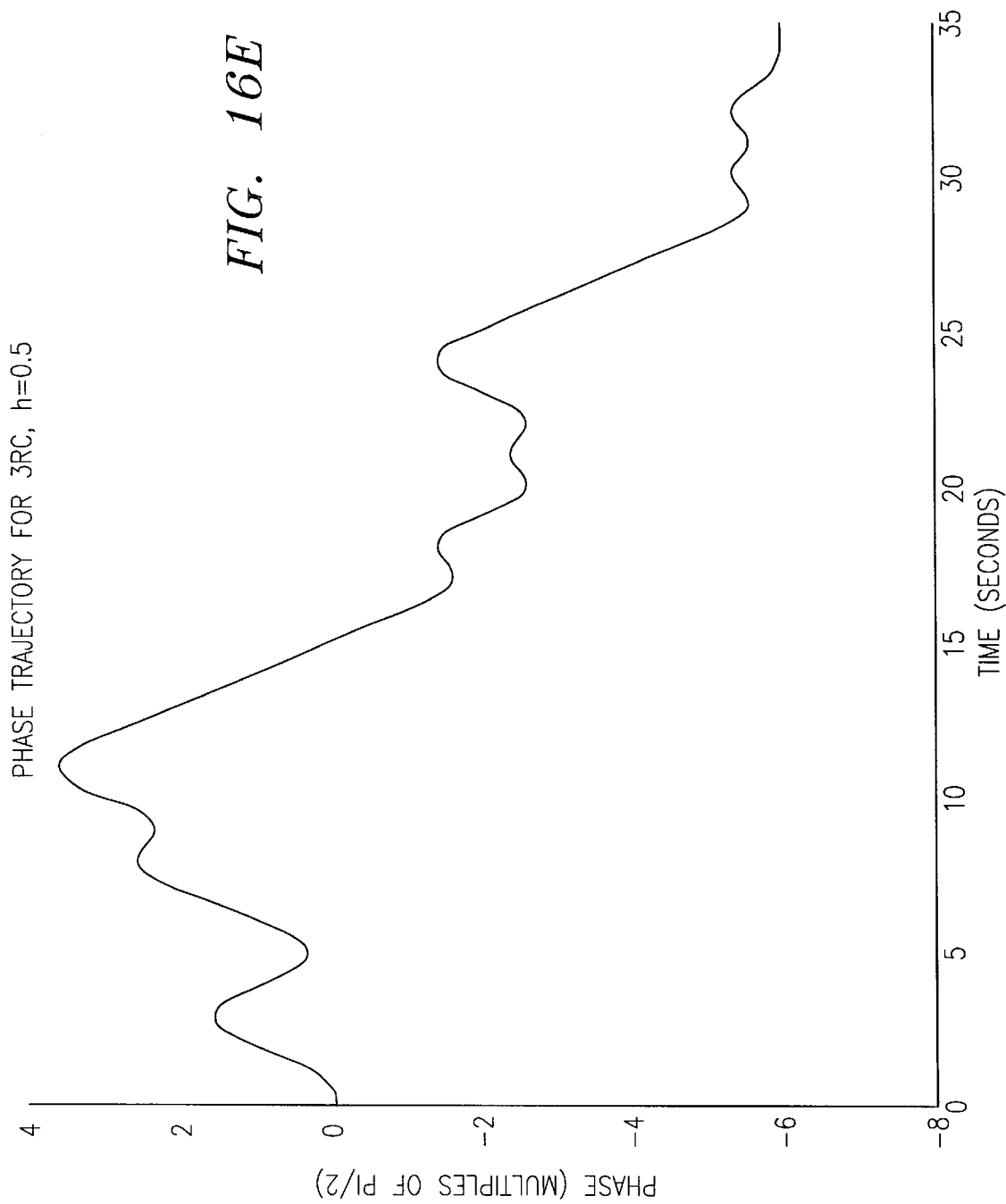

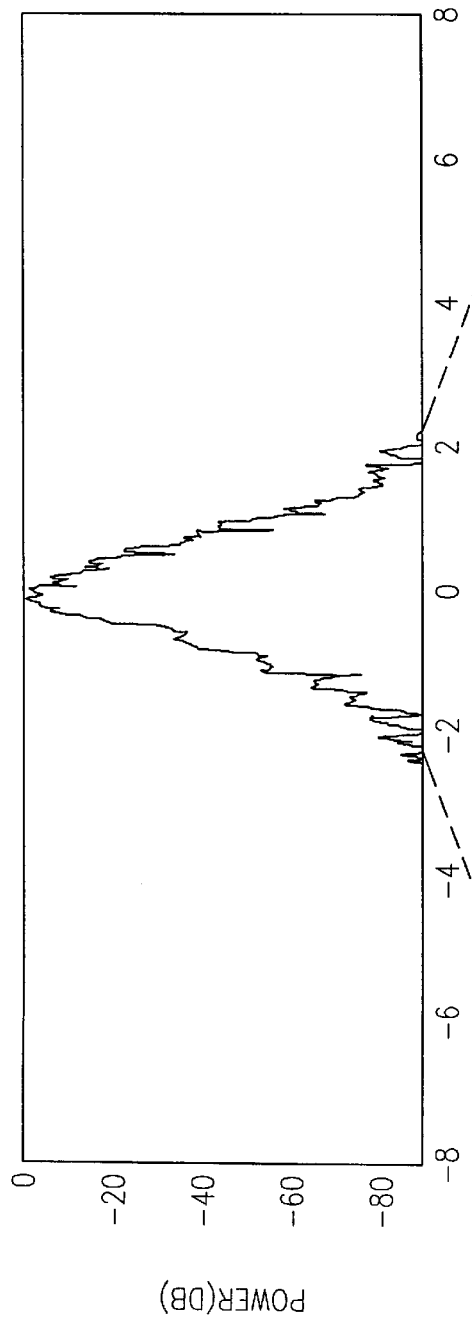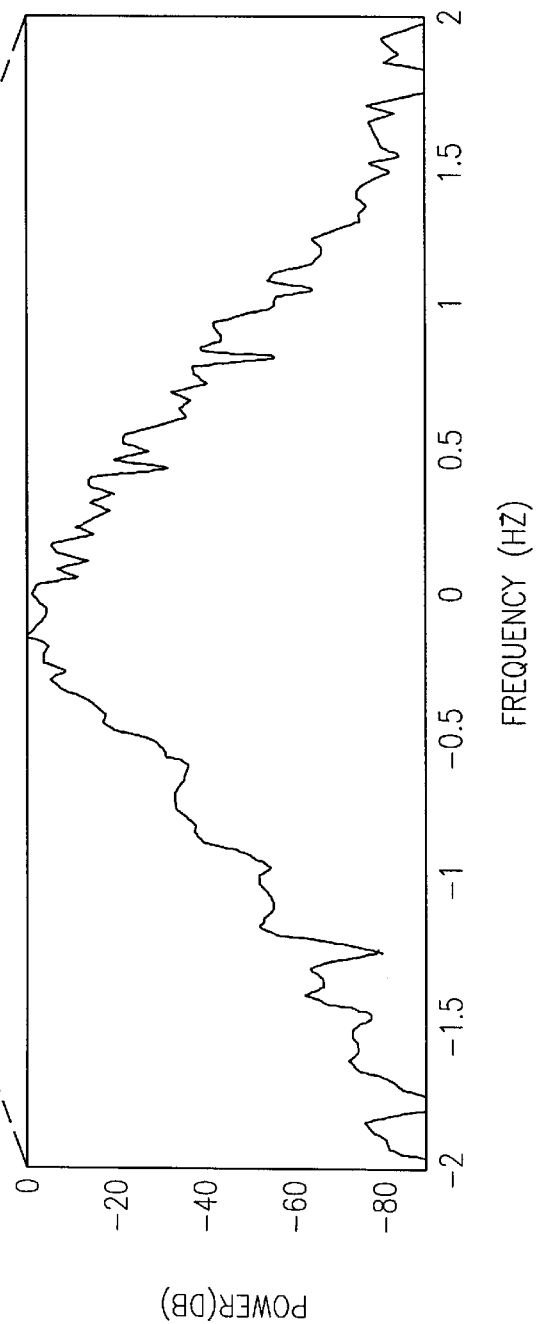
FIG. 16F

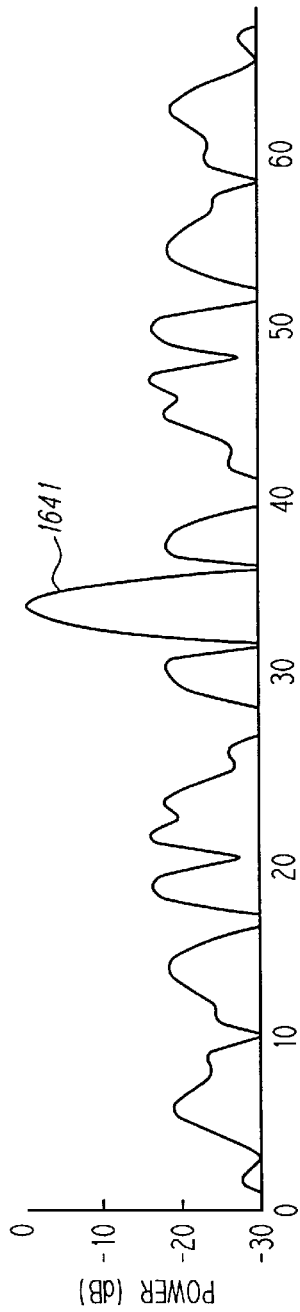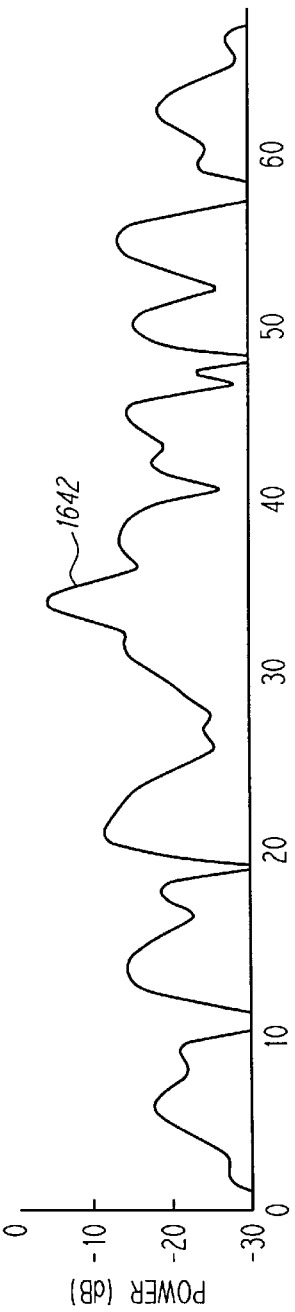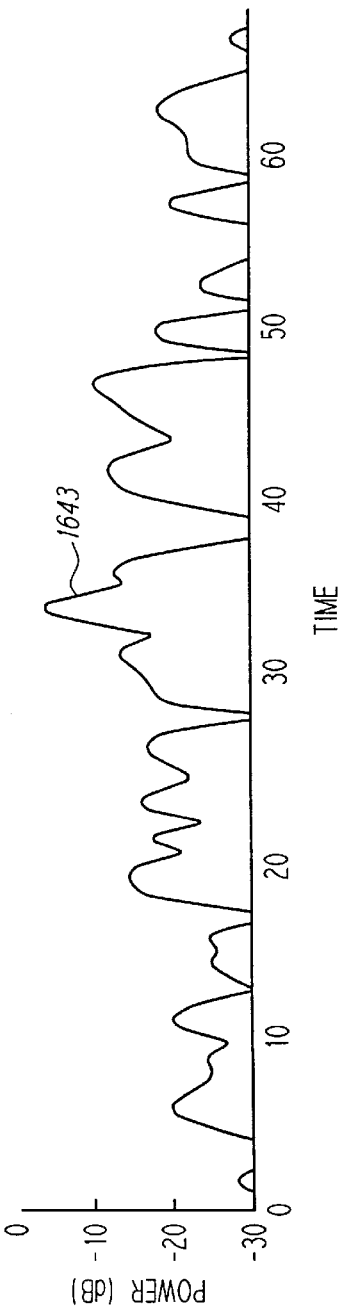
FIG. 16H-1 CORRECT MODULATION INDEX 3RC, h = 0.5, NO QUANTIZATION MF
FIG. 16H-2 LOW MODULATION INDEX 3RC, h = 0.4 (PEAK AT MF PEAK, PEAK) = (-3.85, -3.718 @ 0.1875 SEC) dB
FIG. 16H-3 HIGH MODULATION INDEX 3RC, h = 0.6 (PEAK AT MF PEAK, PEAK) = (-3.85, -3.718 @ 0.1875 SEC) dB

METHOD AND APPARATUS FOR CONTROLLING THE MODULATION INDEX OF CONTINUOUS PHASE MODULATED (CPM) SIGNALS

FIELD OF THE INVENTION

The field of the present invention pertains to communications and, more particularly, to a method and apparatus for generating continuous phase modulated waveforms.

DESCRIPTION OF RELATED ART

Continuous phase modulated (CPM) waveforms are generally characterized by a nominally constant envelope and lack of an amplitude modulation component. Known CPM signal types include several variations, such as, e.g., signals generated by minimum shift keying (MSK), Gaussian pre-filtered MSK (GMSK), superposed quadrature amplitude modulation (SQAM), staggered quadrature offset raised cosine modulation (SQORC), and others. Explanations of various CPM techniques may be found in the following: Frank Amoroso and James A. Kivett, "Simplified MSK Signaling Technique," *IEEE Transactions on Communications*, April 1977, pp. 433–441; Mark C. Austin and Ming U. Chang, "Quadrature Overlapped Raised-Cosine Modulation," *IEEE Transactions on Communications*, Vol. Com-29, No. 3, March 1981, pp. 237–249; Kazuaki Murota and Kenkichi Hirade, "GMSK Modulation for Digital Mobile Radio Telephony," *IEEE Transactions on Communications*, Vol. Com-29, No. 7, July 1981, pp. 1044–1050; and J. S. Seo and K. Feher, "SQAM: A New Superposed QAM Modem Technique," *IEEE Transactions on Communications*, Vol. Com-33, March 1985, pp. 296–300.

One advantage of using CPM techniques is that "class C" amplifiers may be used for transmitting signals. Class C amplifiers tend to be less costly in terms of power consumption than linear amplifiers (such as class A amplifiers).

CPM techniques may be advantageously used in a variety of applications, including spread spectrum communication and related applications. Spread spectrum communication is a type of communication in which the bandwidth of the transmitted signal generally exceeds the maximum bandwidth required to transmit the data being sent. In direct sequence spread spectrum communication, a data signal is typically modulated with a pseudo-random chip code to generate a transmitted signal spread over a relatively wide bandwidth. The transmitted signal has a low spectral density and appears essentially as noise to those not knowing the chip code. Consequently, spread spectrum communication provides increased security of transmitted information and reduced interference with other sensitive radio equipment being used in the surrounding environment.

Due to the encoded nature of the spread spectrum signal, it is typically necessary at the receiver to despread the received spread spectrum signal in order to recover the original data. In one spread spectrum technique, for example, despreading of the spread spectrum signal is accomplished by correlating the received signal with a reference code matching the pseudo-noise code used by the transmitter to transmit the information. After initial correlation is achieved, it is generally necessary to maintain synchronization by tracking the incoming signal so as to keep it aligned with the local reference code.

One problem that has been encountered in spread spectrum and other types of communication is spectral containment of a transmitted signal. Many signal transmission techniques result in the undesired generation of sidelobes, harmonics, intermods, and/or other out-of-band spectral emissions or by-products. Because many types of communication are restricted to specific frequency bands (e.g., by governmental regulations, licensing restrictions, or system interference avoidance requirements), the creation of undesired spectral by-products can lead to undesired interference with signals on neighboring frequency bands, or may violate regulatory laws pertaining to spectral emissions, or both. Moreover, communication systems using frequency division multiplexing, by itself or in conjunction with code division multiplexing or time division multiplexing, often require good spectral containment of transmitted signals so as to achieve optimal performance characteristics.

CPM techniques, which generally offer better spectral containment than other types of transmission techniques, may be used in spread spectrum and other types of communication so as to preserve signal bandwidth of the spread spectrum signal when it is amplified and transmitted and reduce spectral splatter and out-of-band emissions. A number of techniques have been developed for generating and transmitting CPM signals in an attempt to obtain satisfactory spectral containment and other benefits. However, presently known techniques have various drawbacks.

One technique for generating CPM signals is by direct frequency modulation. In such a technique, phase changes of the signal to be transmitted are applied to a voltage controlled oscillator which outputs a signal of the general form $s(t)=\cos(\omega t+\phi(t))$, where $\omega$ represents a carrier frequency and $\phi(t)$ represents the change in phase over time. However, direct frequency modulation typically requires a relatively expensive, precision voltage-controlled oscillator to tightly control the modulation index of the CPM signal. Without use of such a precision oscillator, integrated phase tends to drift over a time interval, making proper demodulation difficult or, in some cases, impossible.

Another technique for generating CPM signals is by digital synthesis. An example of this technique is described in John B. Anderson, et al., *Digital Phase Modulation* (Plenum Press 1986), ISBN 0-306-42195-X, pages 211–224. An exemplary block diagram illustrating digital synthesis is shown in FIG. 17 of this application. One disadvantage of digital synthesis is that, at high data or chipping rates, it becomes expensive in terms of power consumption as well as cost. Moreover, digital synthesis may create out-of-band noise components due to the use of digital-to-analog converters. As an additional complicating factor, the corresponding receiver structure for higher performance variants of digital synthesis transmitters are often quite complex because of extensive but carefully controlled intersymbol interference introduced as part of the waveform design. Thus, CPM receivers for demodulating digitally synthesized CPM signals may require some form of trellis decoding, which can include use of a Viterbi algorithm employing multiple filter arms.

Another technique for generating CPM signals is by filtering and hardlimiting a signal to be transmitted. This technique is illustrated, for example, in the *Digital Phase Modulation* reference cited above, at pages 227–231. However, use of this technique is generally restricted to a relatively small subset of CPM signal types. Further, the filter and hardlimit technique requires precise filter shapes and/or a precise phase locked loop transient response.

It would therefore be advantageous to provide a technique for generating constant waveform signals, such as CPM signals, having desirable spectral containment characteristics. It would further be advantageous to provide a CPM technique which maintains tight control over the modulation index and performs well at high chipping rates or data rates, without undue power consumption and without high cost. It would further be advantageous to provide a CPM signal generation method and apparatus without the need for a precision voltage controlled oscillator, precise filter shapes, or a precise phase-locked loop transient response.

SUMMARY OF THE INVENTION

The present invention provides in various embodiments a means for generating a continuous phase modulated or other constant envelope signal waveform while maintaining relatively tight control over the modulation index. In one embodiment, feedback control is used to monitor the transmitted waveform and adjust the modulation index in response thereto. A tracking circuit, which preferably makes use of a second order tracking technique, tracks the amplitude of the transmitted waveform and adjusts the output gain accordingly. The output gain is adjusted by a prefilter for maintaining a constant signal envelope. A tau-dither algorithm may be employed as part of the tracking circuit.

In another embodiment, a gradient search is employed to adjust the output amplitude of the transmitted signal. The step size of the gradient search may be based on the slope of the signal amplitude, and varied dynamically over time.

In another embodiment, two bandwidth differencing is used to adjust the output amplitude of the transmitted signal. This embodiment may comprise a narrowband filter and a wideband filter. The narrowband filter provides a relatively slow response to amplitude changes, and provides a coarse adjustment to the output amplitude. The wideband filter provides a relatively fast response to amplitude changes, and provides a fine adjustment to the output amplitude. Both filters used in conjunction provide an optimum adjustment of the output amplitude.

In a preferred embodiment, the CPM transmitter is part of a transceiver and is operated in a time division multiplexed system. A CPM receiver receives incoming communications during receive intervals, and can be used during transmit (i.e., non-receive) intervals or other correlator dead times to monitor the transmitted CPM signal. The information acquired by the CPM receiver may be used for correlation feedback and adjustment of gain. Further embodiments, variations and enhancements are also described in more detail below.

BRIEF DESCRIPTION OF THE DRAWINGS

The various objects, features and advantages of the present invention may be better understood by examining the Detailed Description of the Preferred Embodiments found below, together with the appended figures, wherein:

FIG. 12 is an alternative embodiment of a CPM transceiver using a phase locked loop for controlling the frequency of the transmitted signal.

FIGS. 16A, 16B, 16E and 16F are phase trajectory and power spectra graphs for two different codewords with a specified modulation index, and FIGS. 16C-1 to 16C-3, 16D-1 to 16D-3, 16G-1 to 16G-3, and 16H-1 to 16H-3 are graphs showing a correlation response for the two codewords when the modulation index is changed.

DETAILED DESCRIPTION OF THE PREFERRED EMBODIMENTS

Figure 1:
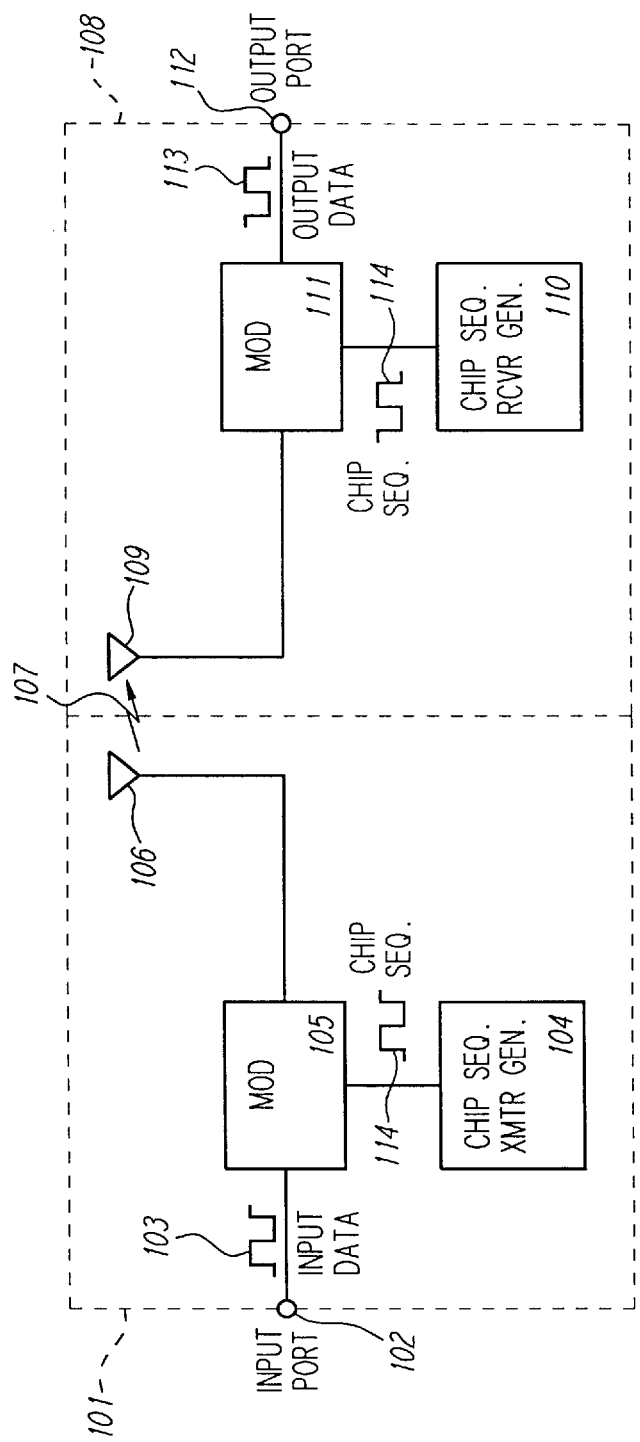
FIG. 1 is a block diagram of a spread-spectrum communication transmitter and receiver as known in the art.

FIG. 1 is a block diagram of a spread-spectrum communication transmitter and receiver as known in the art.

In FIG. 1, a spread-spectrum transmitter 101 comprises an input port 102 for input data 103, a chip sequence transmitter generator 104, a modulator 105, and a transmitting antenna 106 for transmitting a spread-spectrum signal 107. A spread-spectrum receiver 108 comprises a receiver antenna 109, a chip sequence receiver generator 110, a demodulator 111, and an output port 112 for output data 113. In operation, a single chip sequence 114 is identically generated by both the transmitter generator 104 and the receiver generator 110, and appears essentially random to others not knowing the spreading code upon which it is based. An extensive discussion of spread-spectrum communication, spreading codes, and chip sequences, may be found in R. Dixon, *Spread Spectrum Systems with Commercial Applications* (Wiley & Sons, 3d ed. 1994).

Figure 2:
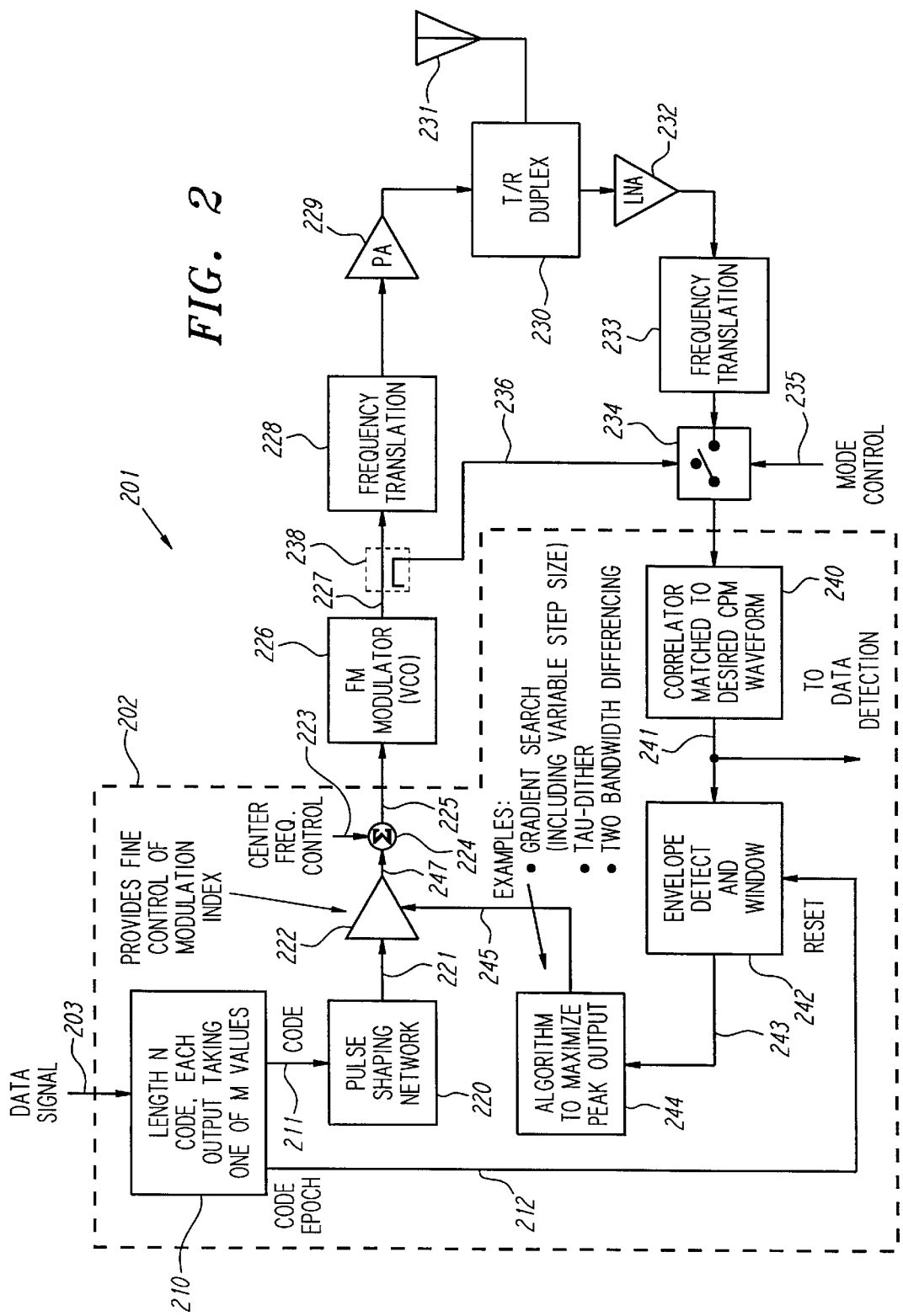
FIG. 2 is a block diagram of a CPM transceiver in accordance with one or more aspects of the present invention using feedback to control a modulation index.

FIG. 2 is a block diagram of a preferred CPM transceiver 201 as may be employed, for example, in a system for spread spectrum communication. The FIG. 2 transceiver may be used with any of a variety of CPM waveform types. One particular type of known CPM signal, for example, is a minimum shift keyed (MSK) signal. An MSK signal is generally characterized by the fact that its phase changes linearly within each chip time, and that the phase change over a single chip time is $\pm\pi/2$ radians ($\pm 90$ degrees). The rate of phase change for a single chip time is $\pm k$, for a suitable value k, and is linear and continuous everywhere except at chip boundaries.

Figure 3:
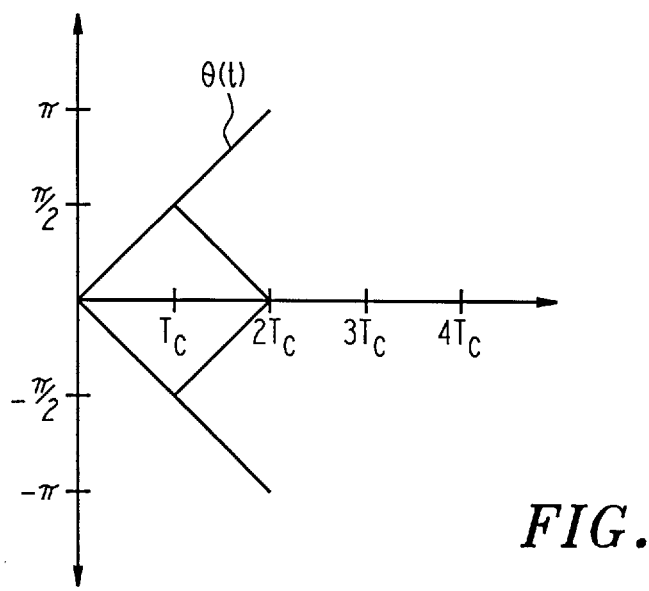
FIG. 3 is a graph of possible phase changes over time for a minimum shift keyed (MSK) signal.
Figure 4:
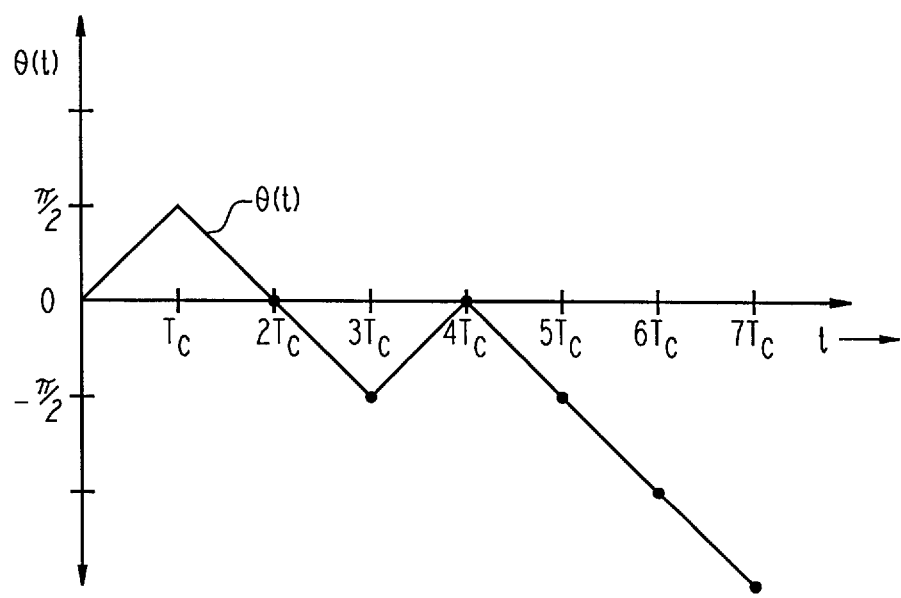
FIG. 4 is a graph illustrating phase changes over time for a particular MSK signal.

FIG. 3 is a graph showing possible changes in phase for an MSK signal over time, wherein the x-axis represents time and the y-axis represents signal phase. In a first chip time from zero to Tc, the phase $\theta(t)$ changes from 0 to $\pi/2$ or $-\pi/2$. In a second chip time, from Tc to 2Tc, the phase $\theta(t)$ changes from $+\pi/2$ to 0 or $+\pi/2$ to $+\pi$, or from $-\pi/2$ to 0 or $-\pi/2$ to $-\pi$, and so on. FIG. 4 is a graph showing an example of how the phase $\theta(t)$ may change for a particular MSK signal in each chip time from 0, Tc, 2Tc, 3Tc, 4Tc, 5Tc, and so on, for the chip sequence "11101001 . . . ." As noted, during each chip time the phase varies for an MSK signal by $\pi/2$ in either a positive or negative direction. Alternative encoding methods such as GMSK, SQAM, or SQORC, differ from MSK in that phase changes of less than $\pm\pi/2$ are allowed. In SQAM or SQORC, the final frequency envelope is no longer constant, but is nearly so.

The modulation index of a CPM signal defines the amount of phase change over a predetermined period. The modulation index is generally given as $2\pi h$, where h represents the gain or, alternatively, a "normalized" modulation index. Thus, for example, for an input pulse with an area equal to $\frac{1}{2}$, induced carrier phase shift equals $\pi h$. Phase change over time is generally given as follows:

$$\phi(t, \alpha) = 2\pi \cdot h \Sigma \alpha_i \cdot q(t - iT)$$

where a summation with respect to i varies from $-\infty$ to $+\infty$, and where t represents time, and q(t) represents a function describing how the phase change of $2\pi\alpha_i h$ evolves with time over a given interval. The function q(t) may be expressed as:

$$q(t) = \int_{-\infty}^{t} g(\gamma) d\gamma$$

for an appropriate function $g(\gamma)$.

In the FIG. 2 embodiment, data is converted into a spread spectrum format for transmission as a CPM signal. A symbol table 210 stores a plurality of codewords (also referred to as symbol codes). Each of the codewords comprises a pre-defined pseudo-random or PN chip sequence corresponding to a predefined pattern of one or more data bits to be transmitted in an M-ary manner. The number of codewords necessary for encoding the data signal 203 is related to the number of data bits in the data bit patterns associated with each codeword. For example, to send one data bit per codeword, it would be necessary to have two codewords, a first codeword representing a binary "1" value and another codeword representing a binary "0" value. As another example, in order to send two data bits per codeword, four codewords are necessary, each of the four codewords representing one of the four combinations of data bits 00, 01, 10, and 11. Similarly, to send three data bits per codeword, eight codewords are required, and so on, so that up to N data bits may be sent using $2^N = M$ codewords.

Alternatively, a chip stream c(t) may be generated by the method shown in FIG. 1—i.e., by modulating a PN sequence with a data stream (e.g., data signal 203). The PN sequence may be generated by use of a feedback shift register code generator (see, e.g., *Spread Spectrum Systems with Commercial Applications*, cited above) or by any other suitable means as known in the art.

Symbol table 210 is connected to a pulse shaping network 220, which generates a waveform in response to codewords output from the symbol table 210. Where direct modulation (i.e., modulation according to the FIG. 1 technique) of the PN sequence is used, the modulated PN signal is connected to the pulse shaping network 220. The specific construction of the pulse shaping network 220 depends on the type of CPM signal to be transmitted. Methods are known in the art for constructing a pulse shaping network 220 responsive to a digital input waveform for generating a CPM signal. For example, to generate an MSK signal, the pulse shaping network 220 essentially comprises a filter. An example of a suitable filter is described in the context of an MSK synthesizer in the Amoroso and Kivett paper "Simplified MSK Signaling Technique" cited previously herein. The pulse shaping network 220 may also be implemented using a finite impulse response (FIR) filter as is known in the art.

Figure 5:
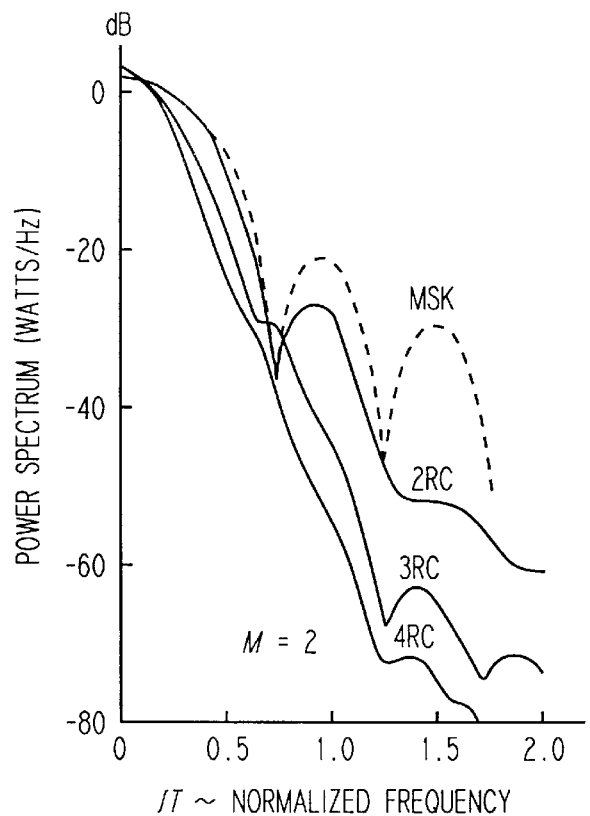
FIG. 5 is a graph of power density spectra for binary CPM waveforms with a modulation index of ½ and different pulse shapes.
Figure 6:
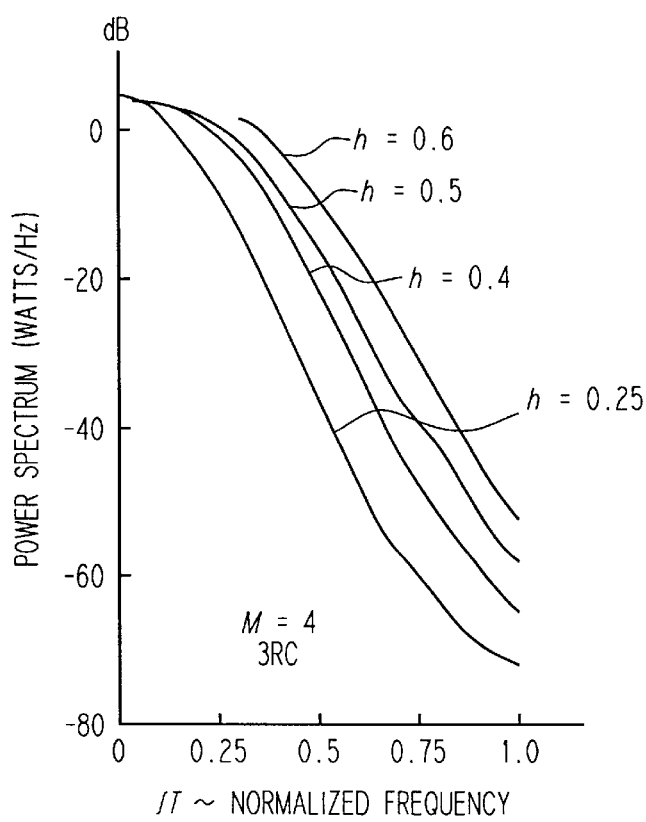
FIG. 6 is a graph of power density spectra for quaternary CPM with different modulation indices.

The pulse duration, in chips, of the signal output from the pulse shaping network 220 may be defined as L. Thus, for example, a pulse shaping network 220 with L=3 implies that the pulse shaping network 220 generates pulses that are three times longer in duration than a single chip. Increasing L improves spectral confinement of the generated signal. This effect can be seen in FIG. 5, which is a graph of power density spectra for several different binary CPM waveforms having a modulation index of $\frac{1}{2}$ and different pulse shapes. FIG. 6 is a graph of power density spectra for quaternary CPM with different modulation indices. As shown in FIG. 6, in general, the smaller the normalized modulation index h, the more tightly contained the power spectrum of the transmitted signal.

Another technique for generating a CPM signal is disclosed in U.S. Pat. No. 5,548,253, entitled "Spectrally Efficient Quadrature Amplitude Modulator," which is hereby incorporated by reference as if fully set forth herein.

The pulse shaping network 220 of FIG. 2 is connected to a variable gain amplifier 222. The variable gain amplifier 222 is connected to one input of a summing circuit 224. Another input of summing circuit 224 is connected to a center frequency control signal 223. An output 225 of the summing circuit 224 is connected to an FM modulator 226, which preferably comprises a voltage controlled oscillator. The FM modulator 226 is connected to a frequency translator 228, which translates its input to a selected frequency band to be used for communication over a designated channel. The frequency translator 228 is connected to a power amplifier 229, which amplifies the output of the frequency translator 228. The power amplifier 229 is connected to an antenna 231 through a transmit/receive duplex switch 230.

Signals received by the antenna 231 over a communication channel are passed through the transmit/receive duplex switch 230 to a low noise amplifier 232. The low noise amplifier 232 is connected to a frequency translator 233, which translates the received signal to an intermediate frequency (IF) signal or a baseband signal for further processing. The frequency translator 233 is connected to a switch 234. Switch 234 is controlled by a mode control signal 235. When signals are being received over a communication channel, they are coupled through switch 234 to a correlator 240. The correlator 240 is matched to the desired CPM waveform type, and to a spread spectrum code of the received signal, if appropriate. The correlator 240 provides an output correlation signal 241 to a data detection unit (not shown). Suitable correlators are described further herein. The output correlation signal 241 is also connected to an envelope detect and window circuit 242. The envelope detect and window circuit 242 is connected to a feedback control circuit 244, which applies a feedback control signal 245 to the variable gain amplifier 222 in response to the output 243 from the envelope detect and window circuit 242, thereby adjusting the modulation index of signals to be transmitted, as described in more detail herein.

The FIG. 2 transceiver generally operates as follows. Codewords are selected from symbol table 210 in response to a data signal 203. The codewords are sent as a chip sequence to the pulse shaping network 220, which outputs in response to the codewords, a pre-modulation signal 221 associated with a CPM waveform such as for example, an MSK, GMSK, SQAM, or other type of CPM waveform. The CPM pre-modulation signal 221 is amplified by the variable gain amplifier 222 according to a level of feedback controlled by the feedback control circuit 244. Exemplary techniques for feedback control in accordance with various embodiments of the present invention are described in more detail herein with respect to, e.g., FIGS. 8–10.

The amplified CPM pre-modulation signal 247 output from variable gain amplifier 222 is summed with a center frequency control signal 223 by summing circuit 224. The center frequency control signal 223 provides a voltage offset to the amplified CPM pre-modulation signal 247 which, when applied to the FM modulator 226, results in the translation of the amplified CPM pre-modulation signal 247 to a desired center frequency $F_c$. The CPM pre-modulation signal 225 output from the summing circuit 224 is connected to FM modulator 226, which outputs an FM signal 227 in response to the voltage level of the voltage-offset CPM pre-modulation signal 225. The center frequency control signal 223, while not necessarily essential, provides rapid convergence to a desired frequency. The center frequency $f_c$ to which the amplified CPM pre-modulation signal 247 is translated is preferably a frequency to which the correlator 240 is attuned (either a baseband or intermediate frequency), as the correlator 240 must correlate to the VCO output signal 227 in order to properly develop useful feedback information as further described herein.

The center frequency control signal 223 will generally comprise a constant voltage value. However, where more than one center frequency is used in the transmitter, the center frequency control signal 223 may comprise a set of constant voltage values with one of the set of voltage values selected for a given center frequency. As an alternative to using a constant voltage level center frequency control signal 223, a phase locked loop (PLL) may be used, as illustrated in the alternative block diagram of FIG. 12, instead of a center frequency control signal 223, as described elsewhere herein. The center frequency control signal 223 embodiment shown in FIG. 2 is generally preferred because it is simpler and less expensive than the PLL embodiment of FIG. 12.

The VCO output signal 227 is connected to the frequency translator 228 which, as noted, translates the VCO output signal 227 to a selected frequency band. The translated VCO output signal generated by frequency translator 228 is amplified by the power amplifier 229 and transmitted by antenna 231 when the transmit/receive duplex switch 230 is configured in a transmit mode.

The transceiver of FIG. 2 preferably operates in a plurality of modes, such as a transmit mode and a receive mode. The FIG. 2 transceiver may also operate in a modulation index adaptation mode, as described in more detail herein, if the transceiver's duty cycle so permits.

In a first embodiment having two modes (i.e., a transmit mode and a receive mode), the transmit/receive duplex switch 230 is positioned or disposed so that the transceiver 201 may transmit signals during the transmit mode, and may receive signals during the receive mode. During the transmit mode, because the transceiver 201 is not receiving a signal, the correlator 240 is unused by the receiver portion of the transceiver 201. The two-mode embodiment takes advantage of the dormant time of the correlator 240 during the transmit mode to monitor the CPM signal being generated for transmission and to provide a feedback measurement of the modulation index.

In the two-mode embodiment, switch 234 selects which signal will be input to the correlator 240. In the receive mode, the switch 234 is positioned or disposed so that the correlator 240 receives and operates on signals received by antenna 231 over an external communication channel. When the transceiver switches from the receive mode to the transmit mode, mode control signal 235 changes state, causing switch 234 to disengage from the external communication channel and to couple correlator 240 to line 236. A coupler 238 connects line 236 to VCO output signal 227 and may comprise, for example, a transformer or any other suitable isolated coupling.

The correlator 240 thereby receives VCO output signal 227 generated by the FM modulator 226 during the transmit mode of the two-mode embodiment. During the transmit mode, the correlator 240 operates on the VCO output signal 227 generated by the FM modulator 226 and assists in regulation of the transmission modulation index by providing a feedback signal to the feedback control circuit 244. The correlator 240 thus correlates to signal 227 and outputs a correlation signal 241 to the envelope detect and window circuit 242.

In another embodiment, the FIG. 2 transceiver operates in a plurality of modes, preferably comprising at least a transmit mode, a receive mode, and a modulation index adaptation mode. This embodiment is referred to herein as a tri-mode embodiment, although it is understood that this descriptor is not intended to limit the transceiver to any particular number of modes. During the receive mode of the tri-mode embodiment, switch 234 is positioned or disposed so that the correlator 240 receives and operates on signals received from antenna 231 over an external communication channel, similar to the operation of the two-mode embodiment. During the modulation index adaptation mode, and possibly during the transmit mode, switch 234 is positioned or disposed so that the correlator 240 receives and operates on the VCO signal 227 generated by the FM modulator 226.

In one embodiment, during the modulation index adaptation mode, the feedback control circuit 244 initially adjusts the gain of the variable gain amplifier 222 by large amounts so as to rapidly converge on an optimal modulation index. Preferably, the modulation index adaptation mode immediately precedes the transmit mode. During the transmit mode, the transceiver 201 uses the modulation index derived during the modulation index adaptation mode. In a variant of the tri-mode embodiment, the gain of the variable gain amplifier 222 is held constant (therefore causing the modulation gain to be nominally constant) during the entire transmit mode. In another variant of the tri-mode embodiment, the correlator 240 continues to monitor the output of the FM modulator 226 through line 236 during the transmit mode, and the feedback control circuit 244 continues to adjust the modulation index. However, during the transmit mode, the feedback control circuit 244 adjusts the gain of variable gain amplifier 222 by only relatively small amounts, as compared with the modulation index adaptation mode, so as not to significantly disrupt the output signal of the FM modulator 226 while transmitting signals over the external communication channel.

The two mode and tri-mode transceiver embodiments are described in more detail below with respect to particular embodiments of the feedback control circuitry.

Correlator 240 may be embodied, or may be used in conjunction with techniques, as described in, e.g., U.S. Pat. No. 5,016,255 entitled "Asymmetric Spread Spectrum Correlator" issued in the name of inventors Robert C. Dixon and Jeffrey S. Vanderpool; U.S. Pat. No. 5,022,047 entitled "Spread Spectrum Correlator" issued in the name of inventors Robert C. Dixon and Jeffrey S. Vanderpool; U.S. Pat. No. 5,081,642 entitled "Reciprocal SAW Correlator Method and Apparatus" issued in the name of inventors George D. O'Clock, Jr. and Jeffrey S. Vanderpool; U.S. Pat. No. 5,276,704 entitled "SAWC Phase Detection Method and Apparatus" issued in the name of inventor Robert C. Dixon; U.S. patent application Ser. No. 08/304,091 entitled "Spread Spectrum Transmitter" filed on Sep. 9, 1994, in the names of inventors Randy Durrant, Mark Burbach, Ryan Jensen and Claude Williams; U.S. patent application Ser. No. 08/383,518 entitled "Spread Spectrum Correlation Using SAW Device" filed on Feb. 3, 1995, in the name of inventor Logan Scott; and U.S. patent application Ser. No. 08/432,913 entitled "Method and Apparatus for Despreading Spread Spectrum Signals" filed on May 1, 1995, in the name of inventors Robert Gold and Robert C. Dixon; each of which patents and applications is assigned to the assignee of the present invention and hereby incorporated by reference as if fully set forth herein. In particular, details regarding coherent and non-coherent correlation of CPM signals (such as MSK signals) may be found in U.S. patent application Ser. No. 08/304,091, cited above.

The envelope detect and window circuit 242 tracks the envelope of the correlation signal 241. The envelope detect and window circuit 242 may also provide time windowing, if desired, to decrease sensitivity to noise during times when a correlation pulse from correlator 240 is not expected, and to prevent a feedback response to signals received when the transceiver is in the receive mode. For example, the envelope detect and window circuit 242 may sample the correlation signal 241 at the time when the maximum correlator response is expected (i.e., towards the end of the symbol code being transmitted), and may be synchronized with the symbol table output 211 to permit appropriate time windowing. Alternatively, synchronization of the timing window may be achieved by using the historical correlation output. For example, in an M-ary system, once a first symbol code of L chips has been detected, subsequent symbol codes will be expected to appear approximately L chips later in time. The envelope detect and window circuit 242 may therefore mask the output of correlation signal 241 except during a predefined period or time window immediately preceding and immediately following L chips after the previous symbol code was detected. Extraneous correlation pulses generated outside of the time window are ignored.

The envelope detect and window circuit 242 provides an output signal 243 representing the peak amplitude of the transmitted signal to the feedback control circuit 244. The feedback control circuit 244 generates a feedback control signal 245 to variable gain amplifier 222 so as to maximize peak output power and allow fine control of the modulation index.

The feedback control circuit 244 may be embodied in a number of different forms as described in more detail herein. While the preferred embodiments are set forth in the present description of the invention, it is understood that variations of and modifications to these embodiments are also workable and fall within the spirit and scope of the present invention.

In one embodiment, the feedback control circuit 244 is configured as a tau-dither circuit for adjusting the modulation index of the transmitter. Generally, in such a configuration, the feedback control circuit 244 adjusts the gain (and hence the modulation index) of the transmitter in both directions, observes and compares the change in correlation output for both directions, and modifies the gain adjustment accordingly to arrive at an optimal modulation index.

In a particular embodiment, the feedback control circuit 244 functions by taking two pulse amplitude measurements, one with a modulation index that is too high, and one with a modulation index that is too low. The voltage difference between the two pulse amplitude measurements is used by the feedback control circuit 244 as a discriminant indicative of whether the modulation index that is halfway between them is too large or too small. The feedback control circuit 244 then adjusts the modulation index, preferably by a lesser amount than that used to obtain the high correlation and the low correlation values.

Figure 8A:
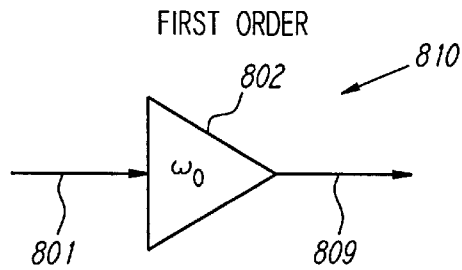
FIGS. 8A–8C are block diagrams of a first order tracking loop filter, a second order tracking loop filter, and a third order tracking loop filter, respectively, which may be used with the CPM transceiver of FIG. 2.
Figure 8B:
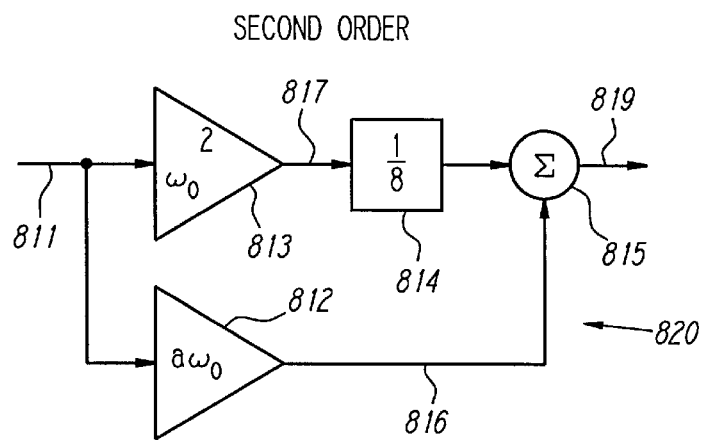
Figure 8C:
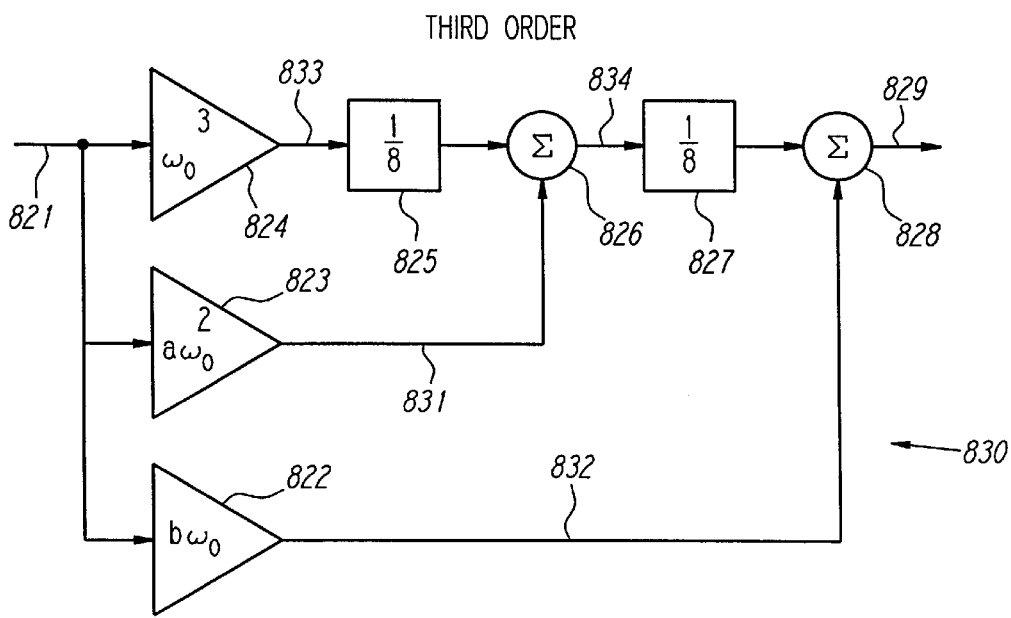
Figure 8D:
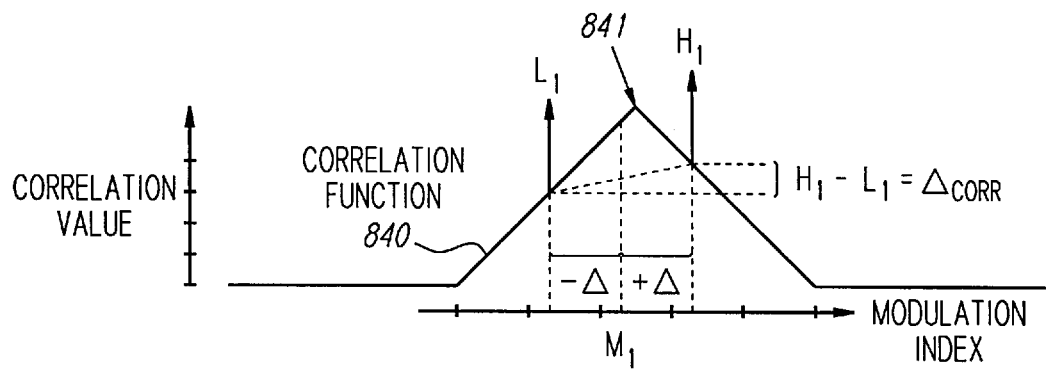
FIGS. 8D and 8E are diagrams showing a graphical representation of a relationship between a correlation function and a modulation index, and illustrating convergence by tracking around a centerpoint.
Figure 8E:
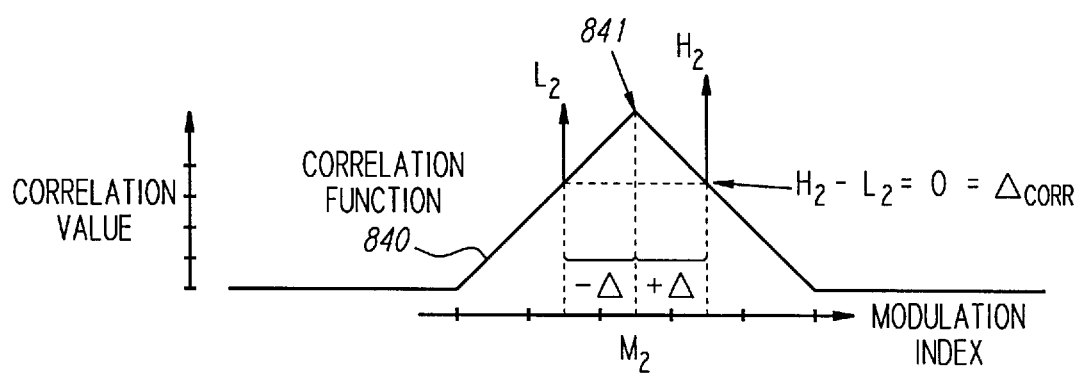

This method may be explained graphically with respect to FIGS. 8D and 8E, each of which depict a correlator output function 840 on a graph plotting correlation value versus modulation index. As the modulation index increases, the correlation value reflected in the correlator output function 840 increases until it peaks at a peak correlation value 841, after which the correlator output function 840 declines. The peak correlation value 841 corresponds to the optimum modulation index value. The difference between the measured high correlation and the low correlation values indicates how far from the optimum modulation index the transmitter is operating.

For example, correlation values $H_1$ and $L_1$ in FIG. 8D derived from a high modulation index value (i.e., the current modulation index $M_1$ plus $\Delta$) and a low modulation index value (i.e., the current modulation index $M_1$ minus $\Delta$), respectively, indicate that the present modulation index value $M_1$ is too low, because the high correlation value H1 is greater than the low correlation value L1. When the difference between the high correlation and the low correlation values is zero, it is assumed that the transmitter is operating around the vicinity of the optimum modulation index. This latter situation is illustrated by high and low correlation values $H_2$ and $L_2$ in FIG. 8E. Because $H_2-L_2$ is zero, no adjustment to the modulation index $M_2$ would be necessary, and the transmitter is assumed to be operating at the optimum modulation index.

The feedback control circuit 244 may include a tracking loop filter for smoothing the adjustment of the gain (and hence modulation index) of the transmitter and for providing a suitable transient response. The tracking loop filter may be of any suitable order (e.g., second order). The tracking loop filter receives as an input a signal representing the difference of the high correlation value (i.e., $H_1$ or $H_2$ in FIGS. 8D and 8E, respectively) and the low correlation value (i.e., $L_1$ or $L_2$ in FIGS. 8D and 8E, respectively). This difference signal is denoted $\Delta_{CORR}$ in FIGS. 8D and 8E. The tracking loop filter outputs a gain adjustment command.

FIGS. 8A–8C are block diagrams of different embodiments of tracking loop filters, each of a different order. FIG. 8A shows a first order tracking loop filter 810; FIG. 8B shows a second order tracking loop filter 820; and FIG. 8C shows a third order tracking loop filter 830.

The first order tracking loop filter 810 of FIG. 8A comprises a proportional gain element 802 which receives an input signal 801 and generates an output signal 809 amplified by a factor of $\omega_0$, thereby implementing a transfer function:

$$F(s)=\omega_0$$

The second order tracking loop filter 820 of FIG. 8B comprises a first proportional gain element 812 which receives an input signal 811 and generates an output signal 816 amplified by a factor of $a \cdot \omega_0$. The second order tracking loop filter 820 further comprises a second proportional gain element 813 which receives the input signal 811 and generates an output signal 817 amplified by a factor of $\omega_0^2$. The output signal 817 from the second proportional gain element 813 is coupled to an integrator 814, the output of which is input to a summer 815. The output signal 816 from the first proportional gain element 812 is also input to summer 815, which combines its inputs to produce an output signal 819. The second order tracker 820 thereby implements a transfer function:

$$F(s)=a \cdot \omega_0+\omega_0^2/s$$

The third order tracking loop filter 830 of FIG. 8C comprises a first proportional gain element 822 which receives an input signal 821 and generates an output signal 832 amplified by a factor of $b \cdot \omega_0$. The third order tracking loop filter 830 further comprises a second proportional gain element 823 which receives the input signal 821 and generates an output signal 831 amplified by a factor of $a \cdot \omega_0^2$, and a third proportional gain element 824 which receives the input signal 821 and generates an output signal 833 amplified by a factor of $\omega_0^3$. Signal 833 is coupled to an integrator 825, the output of which is input to a summer 826. Signal 831 is also input to the summer 826, which combines its inputs and produces an output signal 834. Signal 834 is coupled to a second integrator 827, the output of which is input to a second summer 828. Signal 832 is also input to the summer 828, which combines its inputs and produces an output signal 829. The third order tracker thereby implements a transfer function:

$$F(s)=b \cdot \omega_0+a \cdot \omega_0^2/s+\omega_0^3/s^2$$

Any of the embodiments shown in FIGS. 8A–8C may be implemented in either analog or digital form, depending on system speed and accuracy requirements. If the tracking loop filters 810, 820 or 830 are implemented digitally, then the envelope-detected and time-windowed correlation output signal 243 of FIG. 2 may be digitized by use of an analog-to-digital (A/D) converter (assuming the correlation signal 241 is analog, but it may be digital) and provided to a microprocessor or a digital logic circuit such as an ASIC (i.e., Application Specific Integrated Circuit). The microprocessor or ASIC stores the high correlation value $H_1$ or $H_2$ and the low correlation value $L_1$ or $L_2$, and calculates the correlation differential $\Delta_{CORR}$. The correlation differential $\Delta_{CORR}$ is provided to the tracking loop filter, which outputs a gain adjustment command. The gain adjustment command may be digital-to-analog (D/A) converted for use by the variable gain amplifier 222, or may be sent as a digital command to the pulse shaping network 220 as described later herein with respect to FIG. 15.

Alternatively, the gain adjustment command may be low pass filtered and directly applied to the FM modulator 226.

In a preferred embodiment, the feedback control circuit 244 is configured as the second order tracker shown in FIG. 8B. Operation of the second order tracker of FIG. 8B may be explained in more detail with reference to the process set forth in the flow chart of FIG. 8F and the corresponding exemplary timing diagram shown in FIG. 11A. In general, the method set out in FIG. 8F corresponds to the tri-mode transceiver embodiment described previously, having a modulation index adaption mode as one of the possible modes. Thus, in a first step 850 of the FIG. 8F method, the transceiver enters a modulation index adaptation mode, wherein the modulation index M is to be adjusted and the transmitter "tuned".

Figure 11A:
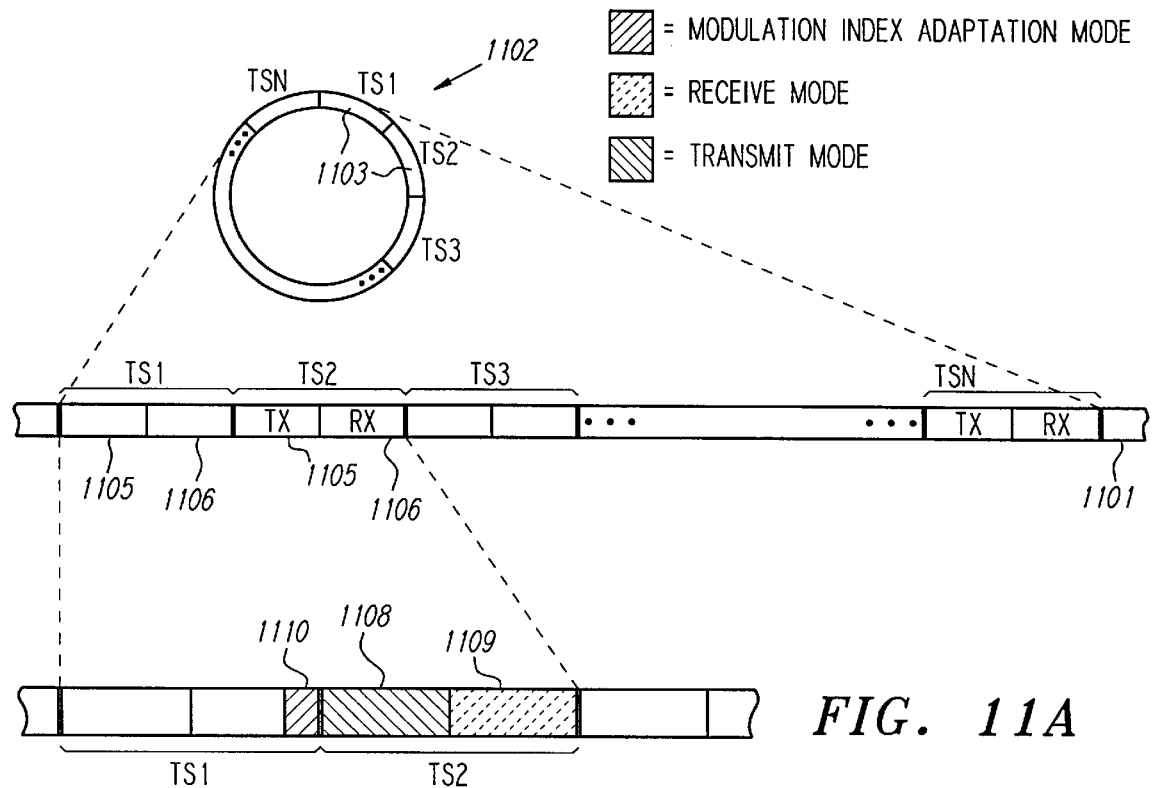
FIGS. 11A–11D are timing diagrams for various time division duplex communication systems showing transmit periods, receive periods, and modulation index adaptation periods.

The duration and relative timing of the modulation index adaptation mode may be explained with reference to the exemplary timing diagram of FIG. 11A, which depicts a time division duplex (TDD) communication timeline 1101. The timeline 1101 comprises a plurality of time loops 1102 (also called time frames or major frames), each of which comprises a plurality of time slots 1103 (also called minor frames). A time loop 1102 is shown imposed upon the timeline 1101 in FIG. 11A. The time slots 1103 of the time loop 1102 are sequentially designated TS1, TS2, TS3, . . . TSN. In the particular TDD system of FIG. 11A, a base station 504 communicates with a plurality of user stations 502 (see, e.g., FIGS. 7A–7B and explanation below) in each time frame 1102. Thus, each time slot 1103 has a first portion 1105 to support a forward link communication between a user station 502 and the base station 504, and a second portion 1106 to support a reverse link communication between the user station 502 and the base station 504. While a variety of TDD or other communication protocols may be employed, the particular TDD communication protocol shown in FIG. 11A is configured such that user stations 502 transmit in the first portion 1105 of a time slot 1103, and the base station 504 transmits in the second portion 1106 of each time slot 1103, thereby implementing a "handset first" or "mobiles first" protocol.

A user station 502 may communicate in one or more time slots 1103. In the FIG. 11A example, it is assumed that a user station 502 is communicating with the base station 504 in the second time slot TS2 of the time frame 1102, and the transceiver of the user station 502 therefore transmits in a first portion 1108 of the second time slot TS2, and receives in a second portion 1109 of the time slot TS2. During the other time slots 1103, the user station 502 is inactive, or may periodically monitor control information broadcast from its base station 504 or neighboring base stations 504. Prior to transmitting, the user station 502 enters the modulation index adaptation mode, as noted in step 850 of FIG. 8F, for a period of time designated by the modulation index adaptation period 1110 in FIG. 11A. The modulation index adaptation mode is preferably begun immediately prior to the transmit portion 1108, in order to maximize the effectiveness of the modulation index tuning.

In some communication protocols (such as a base-first protocol), the transceiver of the user station 502 transmits immediately after receiving. In such a protocol, the correlator 240 (see FIG. 2) may not have enough dead time prior to the transmit portion to tune the modulation index. In such a case, the modulation index adaptation period may precede the receive mode, and the derived modulation index stored during the receive mode until the transmit mode occurs. Alternatively, the modulation index may be tuned while the transceiver is transmitting, as described with respect to alternative embodiments below.

After entering the modulation index adaptation mode, in step 851 the method determines whether the modulation index has previously been set or initialized. If not, then the current modulation index $M_{CURR}$ is set to an initial value $M_{INIT}$ in step 852. The initial modulation index $M_{INIT}$ may be preprogrammed in the transceiver, or may be determined from historical operation of the transceiver. If the modulation index has previously been set or initialized, then in step 853 the current modulation index $M_{CURR}$ is set to the previous modulation index $M_{PREV}$. In each case, the modulation index is adjusted by adjusting the gain of the variable gain amplifier 222, which, as noted, has the effect of altering the modulation index.

In a next step 854, the correlator 240 of FIG. 2 is connected so as to receive an input from the transmitter portion of the receiver (e.g., by setting switch 234 of FIG. 2). In a following step 855, the current modulation index $M_{CURR}$ is temporarily increased by an amount $\Delta$, which may be accomplished by increasing the gain to the variable gain amplifier 222. When the transmitter thereafter transmits information, the correlator 240 in step 856 arrives at a high correlation value H with respect to the transmitted signal and stores the high correlation value H temporarily (e.g., in a volatile memory). The transmitter preferably transmits at least an entire symbol code in order for the correlator 240 to reach a correlation value. The transmitter may alternatively transmit for more than one symbol code to provide longer observation of the effect of changing the modulation index.

In a following step 857, the current modulation index $M_{CURR}$ is temporarily decreased by an amount $\Delta$, which may be accomplished by decreasing the gain to the variable gain amplifier 222. When the transmitter thereafter transmits information, the correlator 240 in step 858 arrives at a low correlation value L with respect to the transmitted signal and stores the low correlation value L temporarily (e.g., in a volatile memory). The transmitter preferably transmits at least an entire symbol code in order for the correlator 240 to reach a correlation value. The transmitter may alternatively transmit for more than one symbol code to provide longer observation of the effect of changing the modulation index.

Selection of the parameter $\Delta$ depends upon how quickly it is desired to converge on the optimum modulation index, and what margin of error in the modulation index is acceptable. The larger the parameter $\Delta$, the more rapid the convergence, but also the less accurate the final modulation value will tend to be. In the modulation index adaptation mode, the parameter $\Delta$ is preferably selected so as to cause an expected $\pi/4$ phase shift in correlation, which should be sufficient to observe a noticeable change in the output of correlator 240. Selection of a suitable gain value $\Delta$ depends upon the particular waveform and the hardware stability and response, including the frequency/voltage characteristic of the FM modulator 226.

In a following step 859, the high correlation value H and the low correlation value L are compared by subtracting the low correlation value L from the high correlation value H to arrive at a differential correlation value $\Delta_{CORR}$. If the differential correlation value $\Delta_{CORR}$ is equal to zero (or within a predefined small range $\alpha$ of zero), as determined in step 860, then no adjustment is made to the modulation index and it is determined in step 863 that the optimum modulation index has been reached. In such a case, the current modulation index $M_{CURR}$ in step 864 is saved as the previous modulation index $M_{PREV}$ for the next modulation index adaptation period, and the procedure is complete.

If the differential correlation value $\Delta_{CORR}$ is not equal to zero (or not within a predefined small range $\alpha$ of zero), then the modulation index $M_{CURR}$ is adjusted in step 861 according to a predetermined modulation index adjustment function. The predetermined modulation index adjustment function may correspond, e.g., to the second order tracking loop filter shown in FIG. 8B. In such a case, the modulation index $M_{CURR}$ is adjusted in the following manner:

$$M_{CURR} = A \cdot \Delta^{\cdot}_{CORR} + B \cdot \Delta_{CORR}$$

where A and B are constants, and $\Delta^{\cdot}_{CORR}$ represents the derivative of $\Delta_{CORR}$. In the discrete time domain, the modulation index $M_{CURR}$ may be adjusted as follows:

$$M_{CURR}(t+1) = A' \cdot [\Delta_{CORR}(t+1) - \Delta_{CORR}(t)] + B' \cdot \Delta_{CORR}$$

where $\Delta_{CORR}(t+1)$ represents the most recently calculated value of $\Delta_{CORR}$, $\Delta_{CORR}(t)$ represents the value of $\Delta_{CORR}$ calculated from the previous cycle, and A' and B' are constants.

Figure 8F:
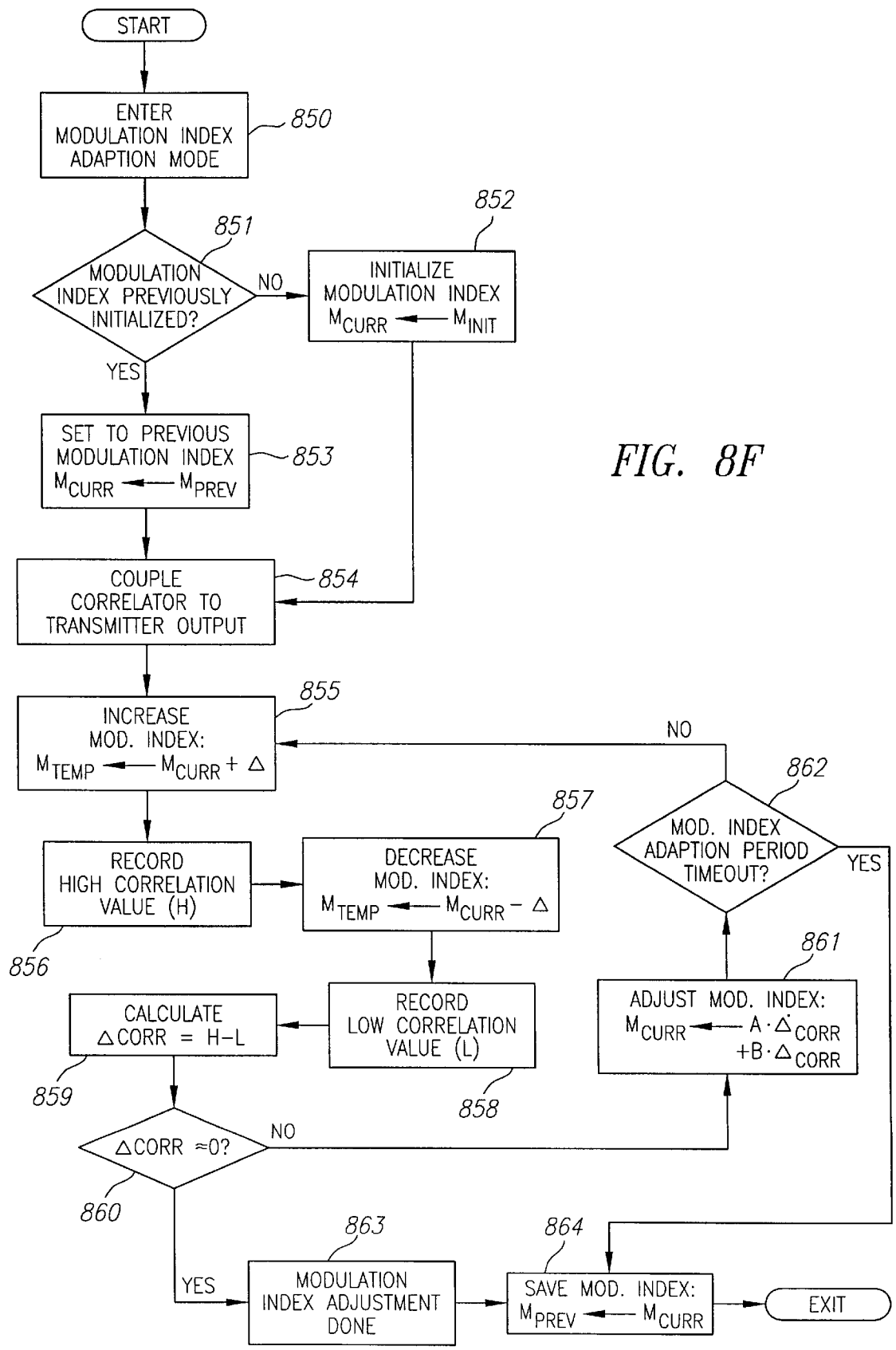
FIG. 8F is a flowchart of a tracking method in accordance with the second order tracking loop filter shown in FIG. 8B, during a modulation index adaptation mode.

Generally, by the method of FIG. 8F, where the current modulation index $M_{CURR}$ is too low, the modulation index will be increased. Conversely, where the current modulation index $M_{CURR}$ is too high, the modulation index is decreased. The amount of increase or decrease depends on the rate of convergence as indicated by the differential correlation value calculated from the previous cycle and the differential correlation value calculated from the present cycle. The constants A and B, or A' and B', are selected using standard feedback control techniques known in the art of feedback control, and may be selected so that the modulation index will decrease by a value less than $\Delta$ during each cycle, in order to avoid oscillation.

After the current modulation index $M_{CURR}$ has been adjusted in step 861, the method of FIG. 8F determines whether the modulation index adaptation period has timed out. If so, the current modulation index $M_{CURR}$ is used in the next transmit mode even though the optimum modulation index may not yet have been reached, and is also saved in step 864 as the previous modulation index $M_{PREV}$ for the next modulation index adaptation period.

In the exemplary TDD timing diagram of FIG. 11A, it is assumed that the transceiver is not either transmitting or receiving during the entirety of the time frame 1102, so that some portion of the time frame 1102 will be available for modulation index adaptation or tuning. However, in some instances, particularly for a base station 504 in a TDD communication system, the transceiver may be in a transmit mode or a receive mode at virtually all points of the time frame 1102, leaving no exclusive time interval for modulation index adaptation. In such a case, there are several alternative approaches to providing for modulation index adaptation, as will be described with respect to the alternative TDD timing diagrams shown in FIGS. 11B–11D.

Figure 11B:
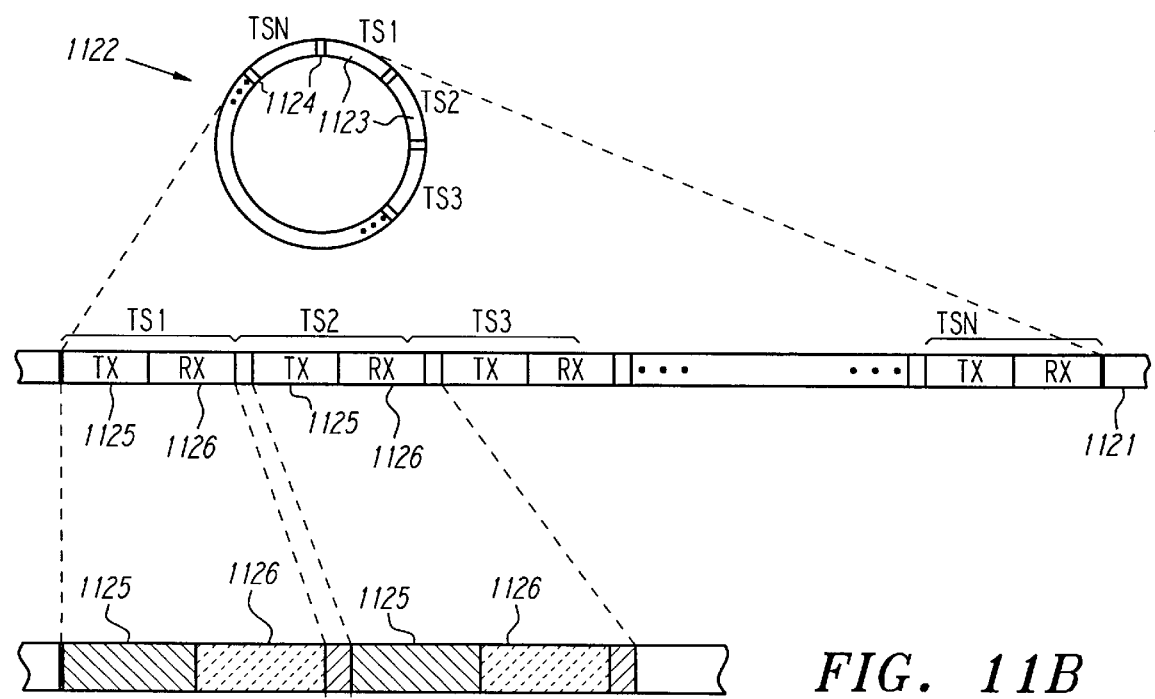

FIG. 11B is a TDD timing diagram depicting a TDD communication timeline 1121. Similar to the FIG. 11A timing diagram, the timeline 1121 comprises a plurality of time loops or time frames 1122, each of which comprises a plurality of time slots 1123. A time loop 1122 is shown imposed upon the timeline 1121 in FIG. 11B. The time slots 1123 of the time loop 1122 are sequentially designated TS1, TS2, TS3, . . . TSN. In the particular TDD system of FIG.

11B, a base station 504 communicates with a plurality of user stations 502 (see, e.g., FIGS. 7A–7B) in each time frame 1122. Thus, as with the FIG. 11A timing diagram, each time slot 1123 has a first portion 1125 to support a forward link communication between a user station 502 and the base station 504, and a second portion 1126 to support a reverse link communication between the user station 502 and the base station 504. A variety of TDD or other communication protocols may be employed, wherein either the base station 504 or the user stations 502 transmit first in each time slot 1123.

In the FIG. 11B timing diagram, a modulation index adaptation period 1124 is provided between each time slot 1123, such that the transceiver may perform modulation index adjustment or tuning in a modulation index adaptation mode. The length of the modulation index adaptation period 1124 depends upon the average convergence time of the feedback control circuit 244 (such as, e.g., the second order tracker of FIG. 8B), but is expected to be relatively short compared to the duration of a time slot 1123. The transceiver may thereby carry out modulation index adjustment between each time slot 1123, such as by employing the method of FIG. 8F. While it is preferred (as shown in FIG. 11B) to have the modulation index adaptation period 1124 immediately prior to the transmit period 1125, it is also possible to store the modulation index derived during the modulation index adaptation period 1124 where the transmit mode does not occur until a later time.

Figure 11C:
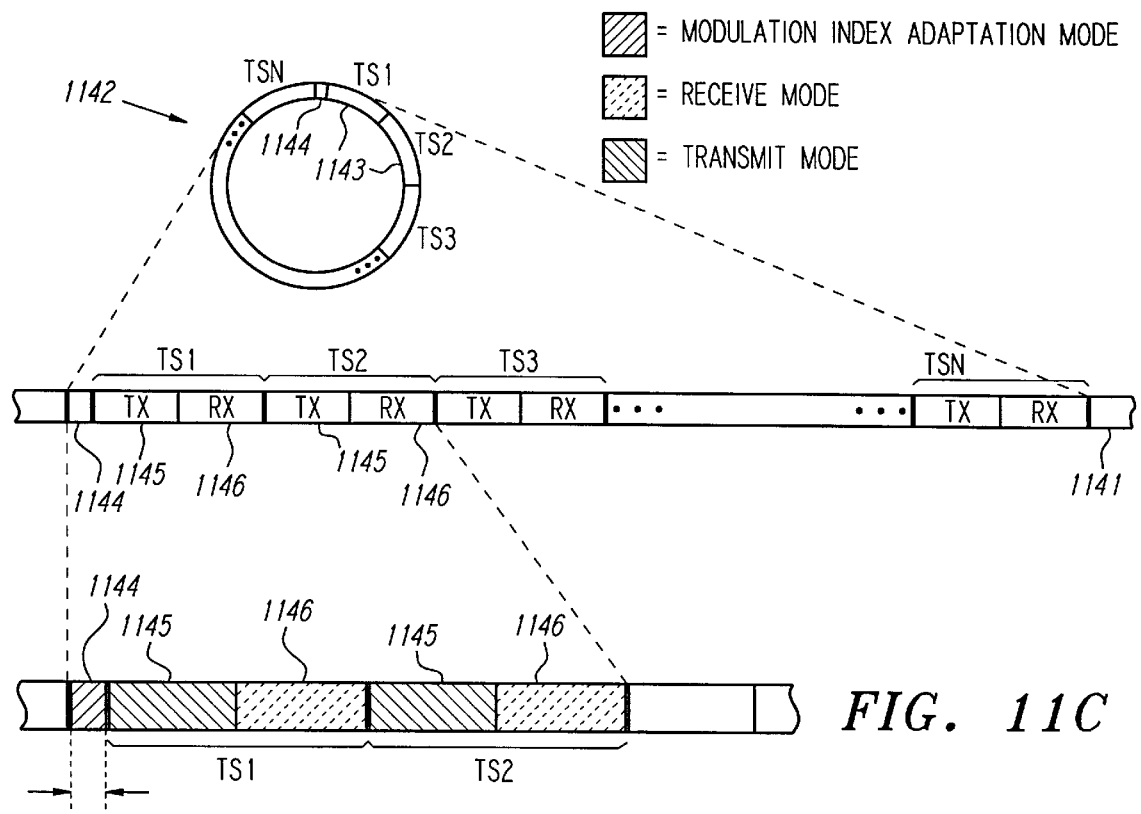

FIG. 11C is an alternative TDD timing diagram depicting a TDD communication timeline 1141. Similar to the timing diagrams of FIGS. 11A and 11B, the timeline 1141 comprises a plurality of time loops or time frames 1142, each of which comprises a plurality of time slots 1143. Instead of having a modulation index adaptation period between every time slot (such as shown, for example, in the FIG. 11B timing diagram), in the FIG. 11C embodiment, there is a single modulation index adaptation period 1144 appearing once per time frame 1142 (e.g., at the start of the time frame 1142). With the FIG. 11C embodiment, it is assumed that the transmitter hardware is such that the modulation index will not drift unacceptably during an entire time frame period. The modulation index may be adjusted during the modulation index adaptation period 1144 using the method, e.g., discussed with respect to FIG. 8F.

Figure 11D:
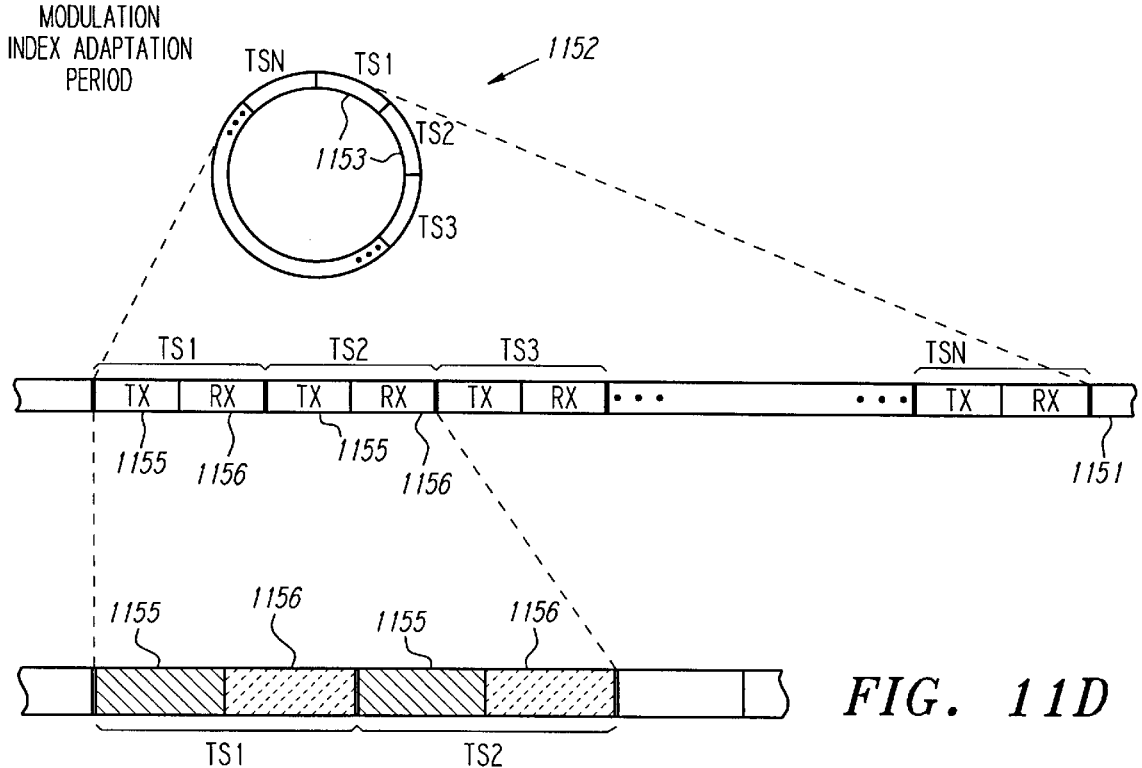

FIG. 11D is another alternative TDD timing diagram depicting a TDD communication timeline 1151. Similar to the timing diagrams of FIGS. 11A–11C, the timeline 1151 comprises a plurality of time loops or time frames 1152, each of which comprises a plurality of time slots 1153. In the FIG. 11D embodiment, no modulation index adaptation periods are provided. Rather, adjustment of the modulation index is carried out during the transmit mode while the transceiver is transmitting information over a communication channel.

Modulation index adjustment during the transmit mode may be explained with reference to the method set forth in the flow chart of FIG. 8G. In a first step 870 of the FIG. 8G method, the transceiver enters a transmit mode, wherein the modulation index M is to be adjusted and the transmitter "tuned" while transmitting. The steps 871 through 881 of the FIG. 8G flow chart are similar to the steps 851 through 861, respectively, of the FIG. 8F flow chart, except for the differences noted as follows. Rather than using the parameter $\Delta$ to set a high modulation index and a low modulation index, the FIG. 8G method uses a parameter $\Delta_T$, less than $\Delta$, for selecting the high modulation and low modulation index. The parameter $\Delta_T$ is preferably selected so as to cause a slight but noticeable difference in the output of the correlator 240, without significantly degrading the output of the transmitter. Due to the extremely high signal-to-noise ratio of the feedback correlation process (resulting from the relative absence of noise and interference sources in the transceiver which would otherwise affect the quality of a transmitted signal), the parameter $\Delta_T$ may be quite small while still accomplishing its purpose in the feedback correlation loop.

Figure 8G:
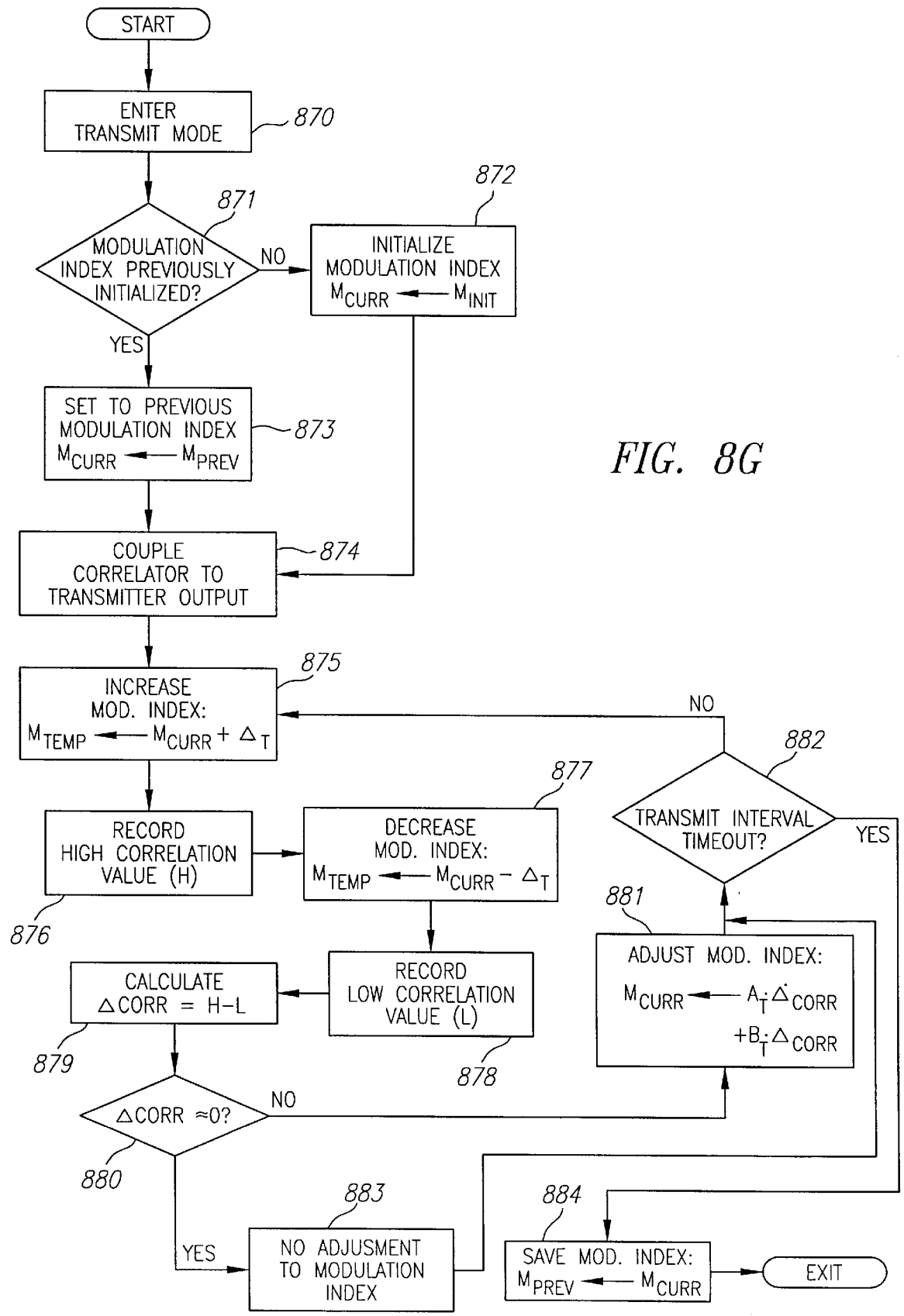
FIG. 8G is a flowchart of a tracking method in accordance with an alternative embodiment of the second order tracking loop filter shown in FIG. 8B, during a transmit mode.

Another difference between the FIG. 8F and FIG. 8G methods is that different parameters are utilized in the predetermined modulation index adjustment function. For example, the constants $A_T$ and $B_T$ used in step 881 of the FIG. 8G method will generally be different than the constants A and B used in step 861 of the FIG. 8F method, because of the desire not to disrupt the transmitter output in the transmit mode, and because it is assumed that only fine tuning will be needed throughout the transmit mode. To facilitate initial setting of the modulation index, a brief tuning or warm-up period may be provided prior to actual operation in the communication system, so that only fine tuning is thereafter necessary during each transmit mode.

Another difference between the FIG. 8F and FIG. 8G methods is that, if no adjustment to the modulation index is determined necessary in step 883, then the process does not finish but continues until the transceiver is no longer in a transmit mode.

After the current modulation index $M_{CURR}$ has been adjusted in step 881, or has remained unadjusted in step 883, the method of FIG. 8G determines whether the transmit interval has expired. If so, then the current modulation index $M_{CURR}$ is saved in step 884 as the previous modulation index $M_{PREV}$ for the next transmit interval.

In any of the timing diagram embodiments shown in FIGS. 11A–11C, the modulation index may be adjusted in both the transmit mode as well as the modulation index adaptation mode. Preferably, during the modulation index adaptation mode, the parameters $\Delta$, A and B are used, and during the transmit mode, the parameters $\Delta_T$, $A_T$ and $B_T$ are used.

As a refinement to the FIG. 8F or 8G methods, the spacing between the high modulation index H and the low modulation index L may be reduced as the ideal or optimum modulation index is approached. Thus, for example, when $\Delta_{CORR}$ decreases to a value less than a predefined threshold $T_{CORR}$, the parameter $\Delta$ may be decreased. Alternatively, multiple threshold values may be used, wherein the crossing of each successively lower threshold value causes the parameter $\Delta$ to be decreased. Alternatively, the parameter $\Delta$ may be adjusted continuously as a function of $\Delta_{CORR}$.

Figure 9:
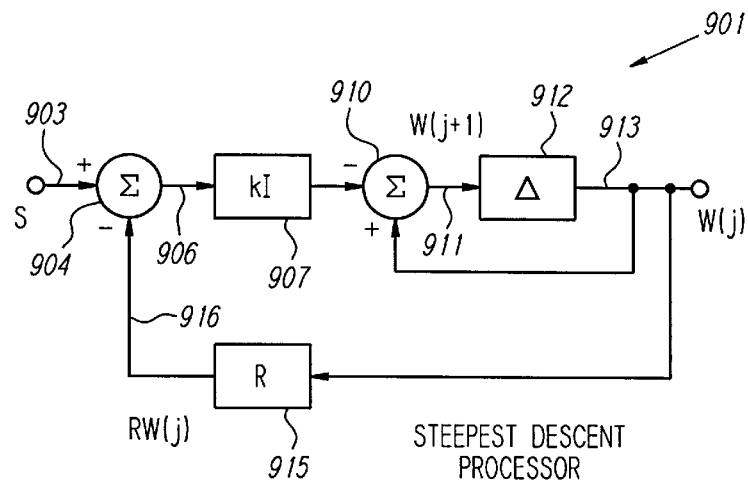
FIG. 9 is a diagram of an embodiment of a gradient search circuit in accordance with an alternative embodiment of the CPM transceiver of FIG. 2.

In an alternative embodiment, the feedback control circuit 244 is configured as a gradient search circuit. A functional block diagram of a particular gradient search circuit, known as a steepest descent processor, is shown in FIG. 9. A steepest descent processor generally operates by carrying out the steps of adjusting an input signal based on a prediction of an optimum operating point, measuring changes to an output signal in response to the change in the input signal, and then altering the input signal in proportion to the amount of change observed in the output. In one aspect, the step size of the gradient search is based on the slope of the output signal amplitude, and is varied dynamically over time. Thus, in the context of the FIG. 2 transceiver, the steepest descent processor of FIG. 9 generally operates by adjusting the modulation index (e.g., by adjusting the gain of variable gain amplifier 222), observing the amount of change in the output of correlator 240, and then modifying the modulation index (e.g., by adjusting the gain of variable gain amplifier 222) in proportion to the amount of observed change in the correlator output.

In more detail, in FIG. 9 an input signal 903 is connected to a summer 904. The summer 904 has an output 906 connected to a gain block 907. The gain block is connected to another summer 910. The summer 910 has an output 911 connected to a sampling block 912, which samples its input every $\Delta_t$ seconds. The sampling block 912 has an output 913 which is fed back to the input of summer 910. The output 913 of the sampling block 912 is also fed back to another gain block 915, and thereafter to the input of the other summer 904.

In operation, the output signal 913, which in a preferred embodiment is a gain command 245 sent to the variable gain amplifier 222 of FIG. 2, is adjusted each time interval, or step, in response to a change in the input signal 903. The input signal 903, in a preferred embodiment, is the peak measured correlation output level corresponding to signal 243 in FIG. 2. The notation W(j), associated with signal 913, refers to the output command signal for the present time interval; the notation W(j+1), associated with signal 911, refers to the output command signal for the next time interval. Thus, as shown in FIG. 9, the output command or output state W(j+1) for the next time interval is a function of both the present output command or output state W(j), and the input signal S.

In each time interval, the steepest descent processor 901 of FIG. 9 derives the next output state W(j+1) by adding the output signal 913 (i.e., the current output state W(j)) with a difference signal which is a function of the output signal 913, the input signal 903, and the constants k and R applied by multiplication blocks 907 and 915, respectively. Thus, the steepest descent processor 901 of FIG. 9 performs the following calculation each time interval:

$$W(j+1) = W(j) + k \cdot \Delta_t \cdot (S - R \cdot W(j))$$

Selection of the parameters k, R, and $\Delta_t$ depends upon the particular waveform and the desired rate of adaptation.

Although the steepest descent processor of FIG. 9 may be implemented in analog form, it is particularly well suited to a digital implementation due to the regular feedback sample intervals.

Further information regarding gradient search processing and steepest descent processors may be found in, e.g., R. A. Manzingo and T. W. Miller, *Introduction to Adaptive Arrays* (Wiley-Interscience 1980); E. Nicolau and D. Zaharia, *Adaptive Arrays* (Elsevier Science Publ. 1989), pages 135–153; and S. Haykin, *Adaptive Filter Theory* (2d ed. 1991) (ISBN 0-13-0132365), pages 275–369. Although the gradient search processor of FIG. 9 will typically converge faster than the FIG. 8 delta modulation circuit, it will not necessarily track any better.

Figure 10:
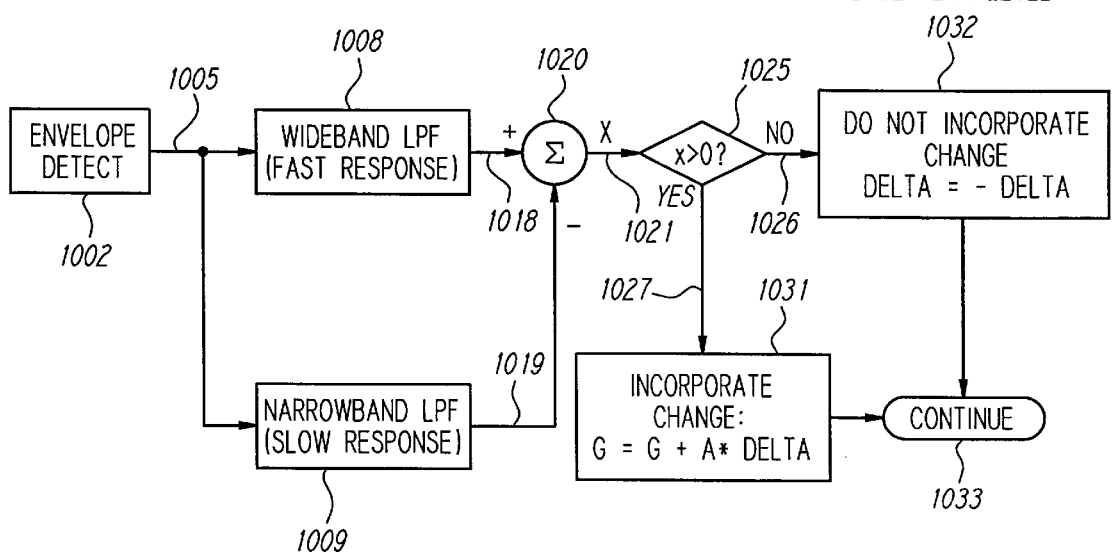
FIG. 10 is a block diagram of a two bandwidth differencing circuit in accordance with another alternative embodiment of the CPM transceiver of FIG. 2.

In another alternative embodiment, the feedback control circuit 244 may be configured as a two bandwidth differencing circuit. A functional block diagram of a two bandwidth differencing circuit is shown in FIG. 10. Generally, the two bandwidth differencing circuit of FIG. 10 employs two filters, a narrowband filter and a wideband filter, as explained in more detail below. The modulation index is periodically adjusted by an amount δ (i.e., by adjusting the gain of variable gain amplifier 222 in FIG. 2). The narrowband filter provides a relatively slow feedback response to amplitude changes, and therefore acts as a coarse adjustment to the output amplitude (and hence to the modulation index). The wideband filter provides a relatively fast feedback response to amplitude changes, and therefore acts as a fine adjustment to the output amplitude (and hence to the modulation index). Both the narrowband filter and the wideband filter operate in conjunction to provide an adjustment of the modulation index.

In more detail, in the two bandwidth differencing embodiment of FIG. 10, an envelope detector 1002 (such as, e.g., envelope detect and window circuit 242 in FIG. 2) has an output 1005 connected to a wideband low pass filter 1008 and to a narrowband low pass filter 1009. The feedback control circuit 244 (see FIG. 2) temporarily changes the modulation index (e.g., by changing the gain of the variable gain amplifier 222) by an amount δ. The duration of the temporary modulation index change is preferably one symbol period or longer; if longer than one symbol period, then preferably an integral multiple of symbol periods. The amount of δ depends primarily on the desired rate of convergence, the desired accuracy, and the mode of operation. In a modulation index adaptation mode (e.g., as described with respect to FIGS. 11A, 11B or 11C), the parameter δ will be larger than in a transmit mode (e.g., as described with respect to any of FIGS. 11A–11D), in order to keep modulation index fluctuations to a minimum during the transmit mode.

In response to a change of the modulation index, the wideband low pass filter 1008 and the narrowband low pass filter 1009 observe whether the peak envelope output from the correlator 240 changes. If the peak envelope output increases, the new modulation index (and hence the new gain amount) is considered a better modulation index value and ought to be retained. If the peak envelope output decreases, the new modulation index (and hence the new gain amount) is not considered a better modulation is index value. In such a case, then, during the next iteration, the modulation index will be decreased by an amount δ (by decreasing the gain of the variable gain amplifier 222), and the peak envelope output of the correlator 240 will again be observed. In the neighborhood of the "optimal" modulation index value (or "optimal" gain value), the selected value will tend to dither about the optimal value.

Accordingly, the wideband low pass filter 1008 has a fast response and tracks changes in the peak envelope output caused by the most recent change in the gain. The narrowband low pass filter 1009, in contrast, has a fairly sluggish response and generally acts as a memory function of what the peak envelope output was for the previous value of the gain. The output 1018 of the wideband low pass filter 1008 and the output 1019 of the narrowband low pass filter 1009 are compared by subtractor 1020, which measures a difference between the outputs 1018 and 1019. The difference value 1021 is compared against zero in a comparison block 1025. If the wideband (fast response) low pass filter 1008 has a larger output 1018 than the output 1019 of the narrowband (slow response) low pass filter 1009 (i.e., the difference value 1021 is greater than zero), it indicates that the most recent value of the gain is a better value. In such a case, in an update block 1031, the new gain is set to:

$$G = G_{OLD} + A \cdot \delta$$

where G is the gain, and A is a tracking loop gain variable used to control the rate of convergence and provide an averaging effect in the setting of G. As A is made larger, convergence becomes faster, but the amount of dither in the gain value G also increases.

If the wideband (fast response) low pass filter 1008 has a smaller output 1018 than the output 1019 of the narrowband (slow response) low pass filter 1009 (i.e., the difference value 1021 is not greater than zero), it indicates that the most recent value of the gain is not a better value. Accordingly, the gain value G is not changed by incorporating δ. In a subsequent block 1032, the feedback control block 244 temporarily changes the gain G of the variable gain amplifier 222 by an amount −δ (i.e., changes the sign of δ), and uses the wideband low pass filter 1008 and narrowband low pass filter 1009 to observe whether the peak envelope output from the correlator 240 changes. Through multiple iterations, the gain value G is changed until the optimum gain value is reached, at which point changes to the gain value G will tend to dither around that point.

In a particular embodiment in accordance with the FIG. 10 two-bandwidth differencing circuit, the wideband low pass filter 1008 and the narrowband low pass filter 1009 are each implemented as a single-pole low pass filter. The wideband low pass filter 1008 has a relatively fast response and therefore a relatively higher frequency pole, while the narrowband low pass filter 1009 has a relatively sluggish response and therefore a relatively lower frequency pole.

Selection of a suitable gain value G depends upon the particular waveform and the hardware stability and response, including the frequency per volt characteristic of the FM modulator 226. The output f(t) of the FM modulator 226 may be represented as follows:

$$f(t) = f_0 + S \cdot G \cdot g(t)$$

where $f_0$ represents the nominal VCO center frequency of the FM modulator 226, and S represents the change in frequency per input volt applied. Then the output phase of the FM modulator 226 may be described as:

$$\phi(t) = \int 2\pi \cdot f(t) dt$$

Substituting for f(t), and relating the above equation to the modulation index leads to the following derivation:

$$\int 2\pi S \cdot G \cdot g(t) dt = 2\pi \cdot h$$
$$\downarrow$$
$$\pi S \cdot G = 2\pi \cdot h$$
$$\downarrow$$
$$h = S \cdot G/2$$

Thus, for a given change ΔG in the gain value G, a corresponding change Δh (i.e., δ) in the modulation index h may be observed according to the following relationship:

$$\Delta h = S \cdot \Delta G/2$$

Equivalently, for a change Δh in modulation index h, a change in gain may be determined:

$$\Delta G = S \cdot \Delta h/2$$

As an example of a selection of Δh (i.e., δ), consider codewords C1 and C2 having the following patterns:

C1 = 0110001101010111100000001001010

C2 = 110011011000000100101100001010

Figure 16A:
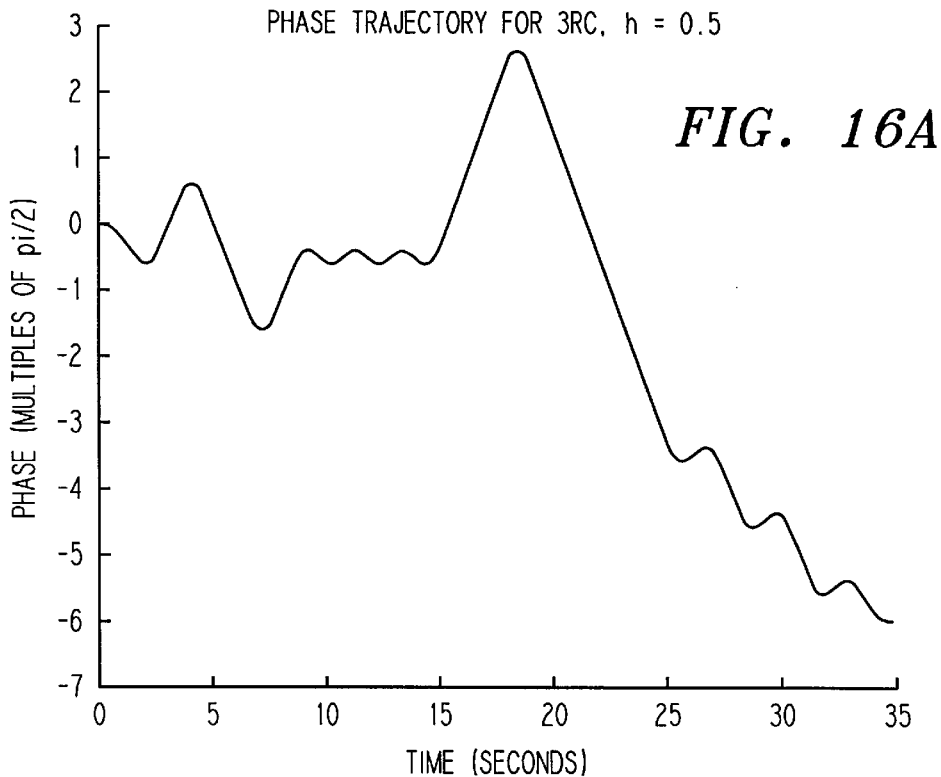
Figure 16B:
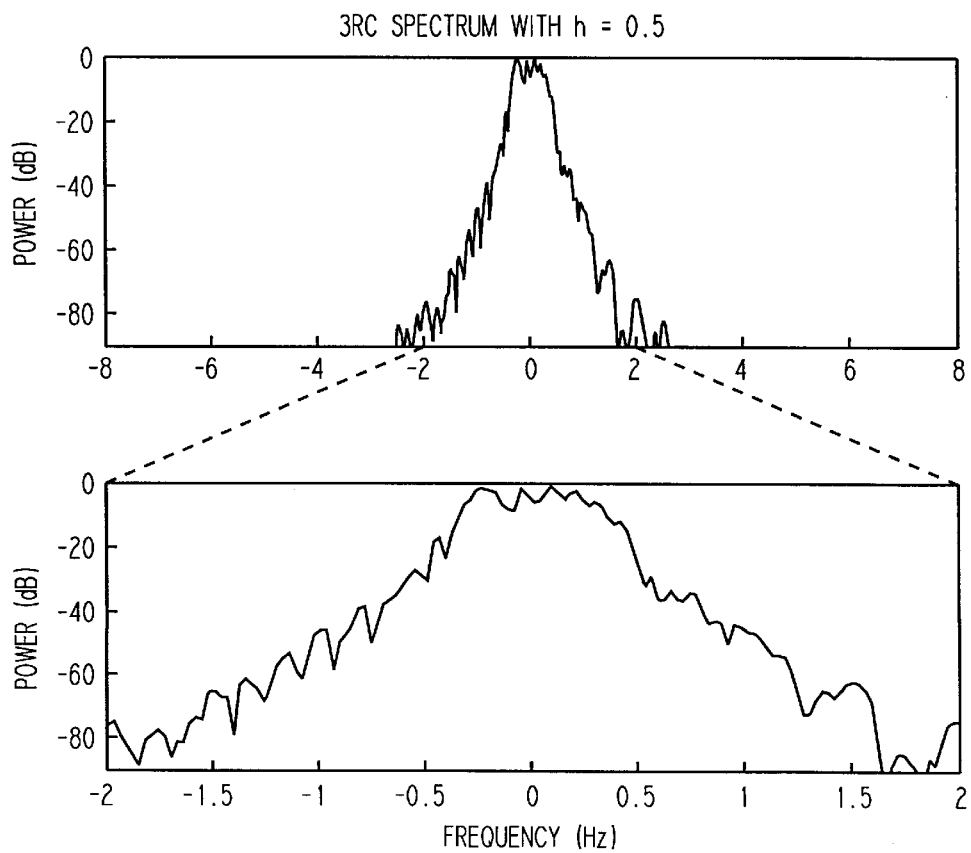
Figures 1, 16C:
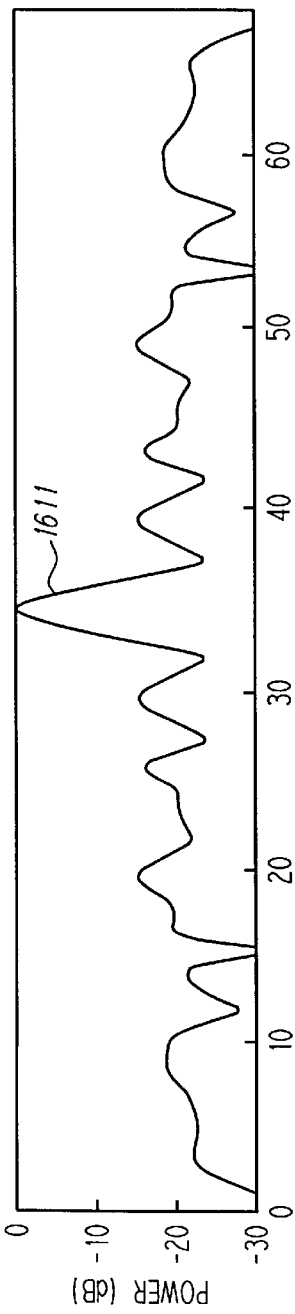
Figures 2, 16C:
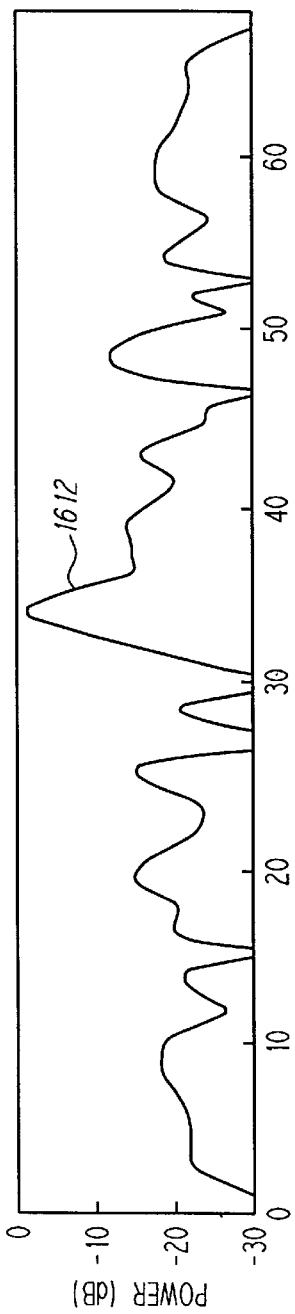
Figures 3, 16C:
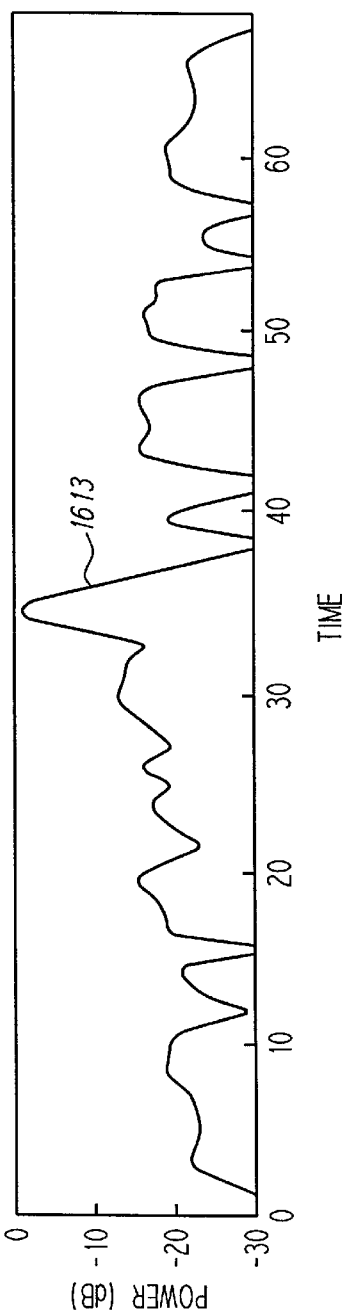

FIGS. 16A and 16B are graphs showing the associated phase trajectory and power spectrum, respectively, for a 3RC modulation format for codeword C1, with a modulation index of h=0.5. FIG. 16C-1 is a graph showing a correlation response of a matched filter for codeword C1. A correlation peak 1611 appears at maximum correlation. FIGS. 16C-2 and 16C-3 are graphs comparing the response of the matched filter when the modulation index h is decreased and increased, respectively, by an amount of 0.05. When the modulation index h is decreased to 0.45, then the graph of FIG. 16C-2 shows a drop in the correlation peak 1612 of 0.5932 dB. When the modulation index h is increased to 0.55, then the graph of FIG. 16C-3 also shows a drop in the correlation peak 1613 of 0.5932 dB.

Figures 1, 16D:
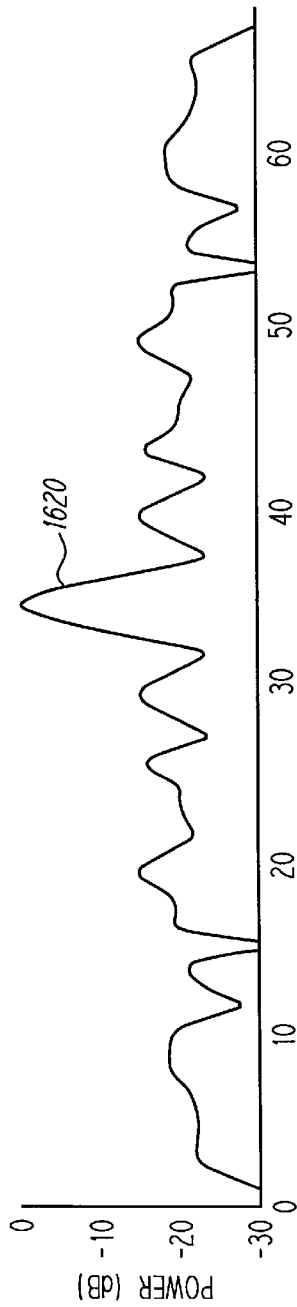
Figures 2, 16D:
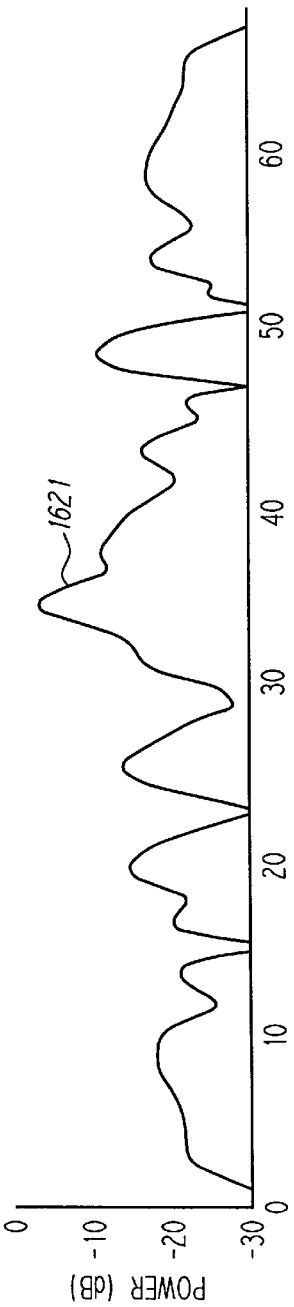
Figures 3, 16D:
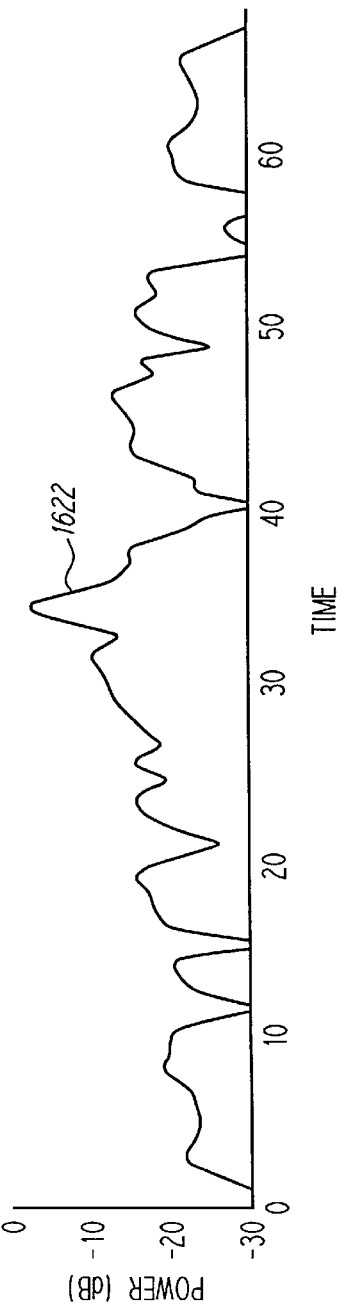

FIGS. 16D-2 and 16D-3 are graphs likewise comparing the response of the matched filter when the modulation index h is decreased and increased, respectively, by an amount of 0.1. FIG. 16D-1 is the same as FIG. 16C-1 and is reproduced to highlight the comparisons. When the modulation index h is decreased to 0.40, then the graph of FIG. 16D-2 shows a drop in the correlation peak 1621 of 2.439 dB. When the modulation index h is increased to 0.60, then the graph of FIG. 16D-3 also shows a drop in the correlation peak 1613 of 2.439 dB.

Figures 1, 16G:
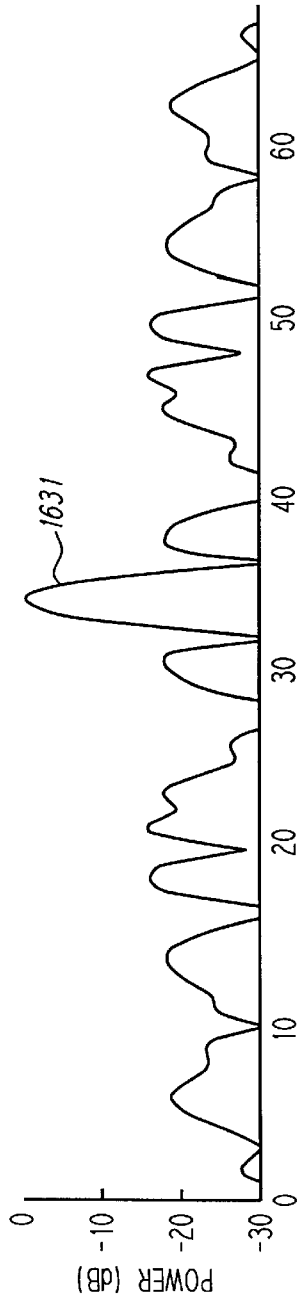
Figures 2, 16G:
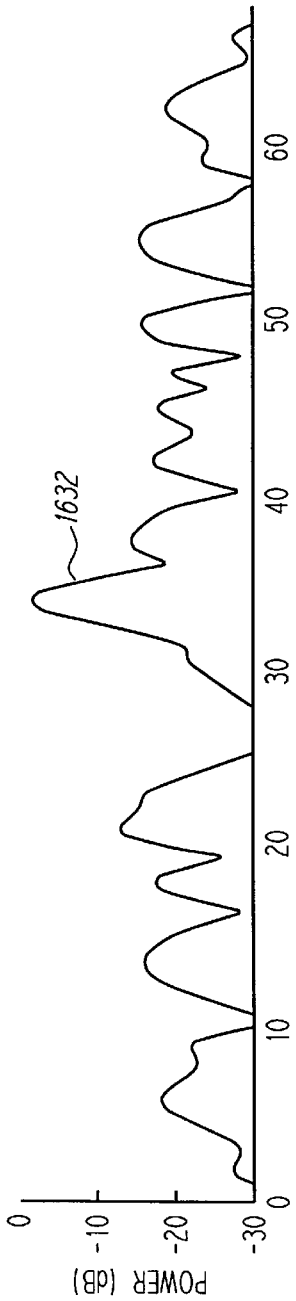
Figures 3, 16G:
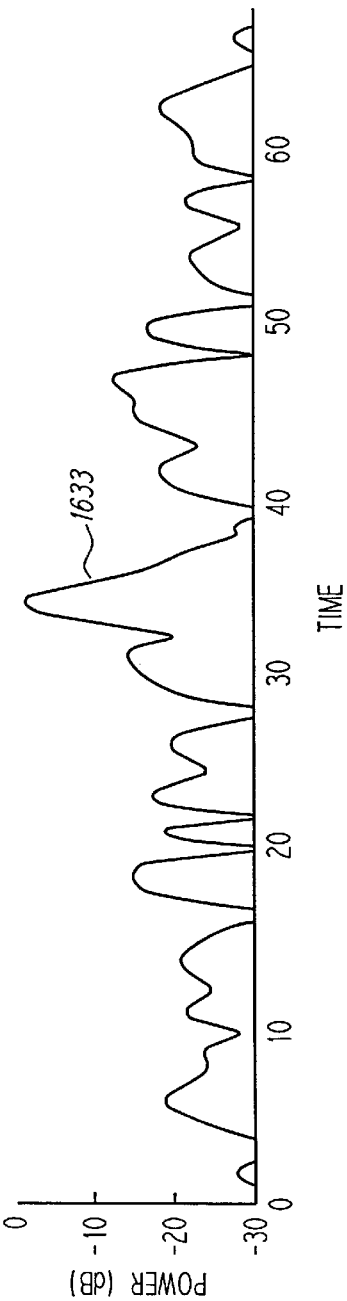
Figure 17:
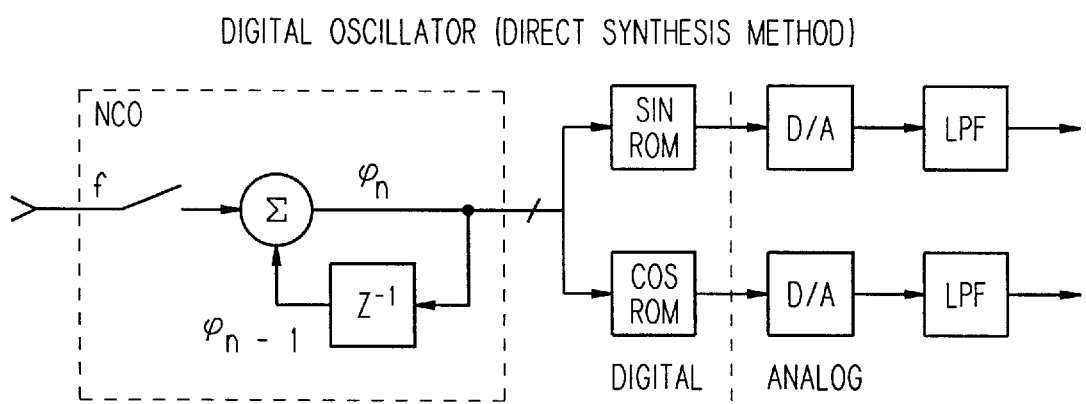
FIG. 17 is a block diagram illustrating direct synthesis generation of a CPM signal.

This analysis may be repeated for codeword C2, also using a 3RC modulation format and a modulation index of h=0.5. FIGS. 16E and 16F are graphs showing the associated phase trajectory and power spectrum, respectively, for codeword C2. FIG. 16G-1 is a graph showing a correlation response of a matched filter for codeword C2. A correlation peak 1631 appears at maximum correlation. FIGS. 16G-2 and 16G-3 are graphs comparing the response of the matched filter when the modulation index h is decreased and increased, respectively, by an amount of 0.05. When the modulation index h is decreased to 0.45, then the graph of FIG. 16G-2 shows a drop in the correlation peak 1632 of about 0.9 dB. When the modulation index h is increased to 0.55, then the graph of FIG. 16G-3 also shows a drop in the correlation peak 1633 of about 0.9 dB.

FIGS. 16H-2 and 16H-3 are graphs likewise comparing the response of the matched filter when the modulation index h is decreased and increased, respectively, by an amount of 0.1. FIG. 16H-1 is the same as FIG. 16G-1 and is reproduced to highlight the comparisons. When the modulation index h is decreased to 0.40, then the graph of FIG. 16H-2 shows a drop in the correlation peak 1642 of 3.85 dB. When the modulation index h is increased to 0.60, then the graph of FIG. 16H-3 also shows a drop in the correlation peak 1643 of 3.85 dB.

When operating in a non-transmit mode, a change Δh (i.e., δ) in the modulation index h is selected so as to cause approximately a 3 dB reduction in the correlator peak. This corresponds to a Δh of somewhere between 0.05 and 0.1 for codeword C2, for example, and could be determined to a suitable degree of accuracy by trial and error until a 3 dB reduction in the correlation peak was obtained. When operating in a transmit mode, a change Δh in the modulation index h is selected so as to cause much less than a 3 dB reduction in the correlator peak, and is preferably small enough so as not to noticeably interfere with reception of the transmitted signal at the other end of the communication link.

FIG. 12 depicts an alternative embodiment of a CPM transceiver 1201 using a phase locked loop to control the center frequency of the FM modulator, wherein elements similar to those of the FIG. 2 transceiver are numbered in a like manner. In the FIG. 12 embodiment, a center frequency control signal 223 as previously described with respect to the FIG. 2 transceiver is not used. Rather, a phase locked loop circuit 1250 is employed for maintaining a predefined center frequency $f_c$ in the transmitter.

Construction of a phase locked loop is generally known in the art. The phase locked loop circuit 1250 of FIG. 12 comprises a carrier recovery circuit 1255 coupled to the output 227 of the FM modulator 226 by coupler 238. The carrier recovery is circuit 1255 is connected to a divide-by-N block 1254, which is connected to a phase detect block 1253. A frequency reference 1252 is also connected to the phase detect block 1253. The phase detect block 1253 is connected to a phase loop filter block 1251 having a transfer function $F_p(s)$ (e.g., a second order filter). The phase loop filter block 1251 outputs a frequency control signal 1256 to summer 224, which combines the frequency control signal 1256 with the output of variable gain amplifier 222 and outputs a signal 225 to the FM modulator 226. The phase locked loop circuit 1250 thereby maintains a VCO center frequency of $N \cdot f_{REF}$, where $f_{REF}$ corresponds to the output of frequency reference 1252.

Details regarding a preferred operating environment for transmission and reception of spread spectrum signals may be found in U.S. Pat. No. 5,402,413 entitled "Three Cell Wireless Communication System," as well as in copending U.S. patent application Ser. No. 08/284,053 filed on Aug. 1, 1994, in the names of inventors Gary B. Anderson, Ryan N. Jensen, Bryan K. Petch, Peter O. Peterson and Sherman Giavette; and U.S. patent application Ser. No. 08/304,091 (entitled "Spread Spectrum Transmitter") and Ser. No. 08/432,913 (entitled "Method and Apparatus for Despreading Spread Spectrum Signals"), cited previously herein, each of which is incorporated by reference as if fully set forth herein.

Figure 7A:
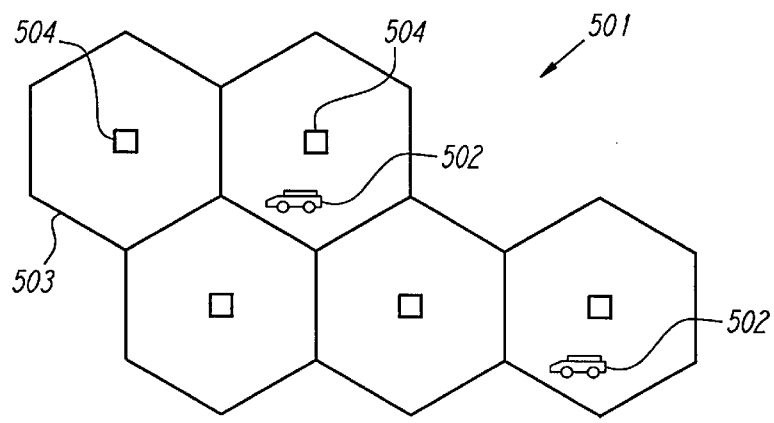
FIGS. 7A and 7B are diagrams illustrating a particular cellular communication environment in which a preferred transceiver may be deployed.
Figure 7B:
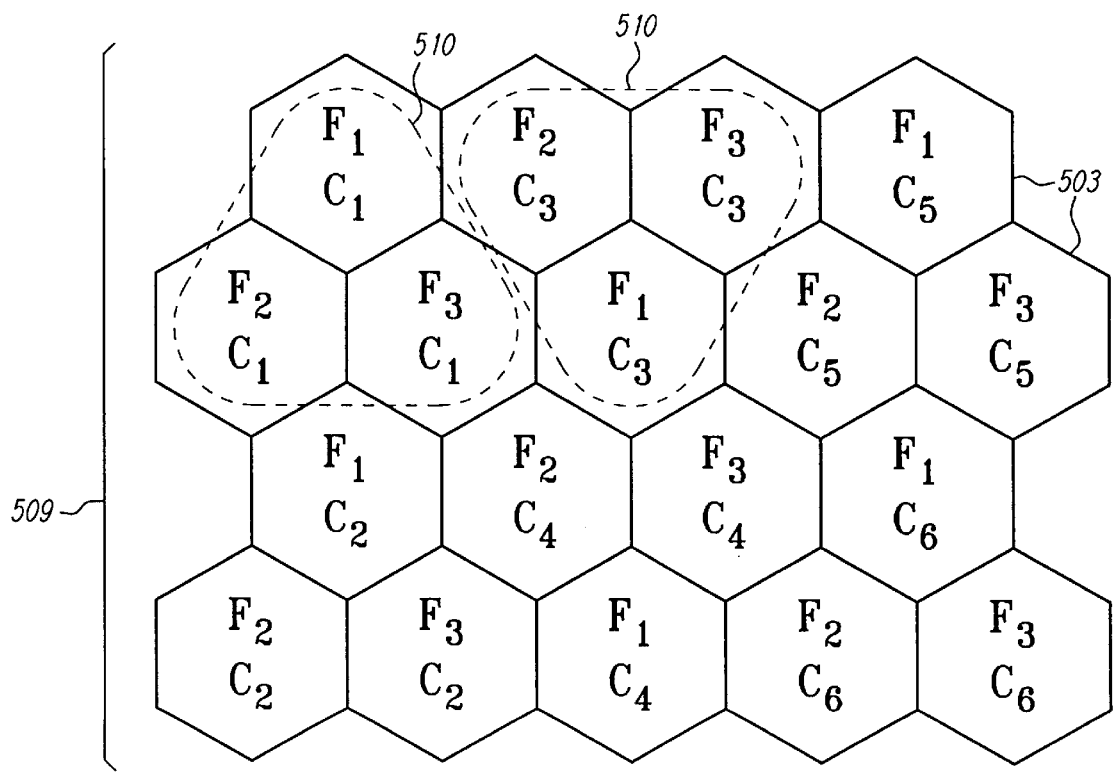

For example, in one embodiment, the FIG. 2 transceiver is operated in a cellular environment such as that shown in FIGS. 7A–7B. FIG. 7A is a diagram of a communication system 501 having base stations 504 and user stations 502. The communication system 501 includes a plurality of cells 503, each with a base station 504, typically located at the center of the cell 503. The FIG. 2 transceiver may be associated with either a base station 504 or a user station 502 in the described cellular environment.

FIG. 7B is a diagram of a preferred cellular environment. A geographical region 509 is divided into a plurality of cells 503. Associated with each cell 503 is an assigned frequency and an assigned spread spectrum code. Preferably, three different frequencies F1, F2 and F3 are assigned in such a manner that no two adjacent cells have the same assigned frequency F1, F2 or F3. The effect of such a frequency reuse pattern is to minimize interference between adjacent cells.

To further reduce potential interference, different orthogonal spread spectrum codes $C_1$, $C_2$, $C_3$, $C_4$, $C_5$, $C_6$ are assigned as shown in adjacent clusters 510. The number of spread spectrum codes used may be selected based upon a particular application. The use of spread spectrum for carrier modulation permits a frequency reuse factor of N=3 for frequencies F1, F2 and F3. Interference between cells 503 using the same carrier frequency F1, F2 or F3 is reduced by the propagation loss due to the distance separating the cells 503 (no two cells 503 using the same frequency F1, F2 or F3 are less than two cells 503 in distance away from one another), and also by the spread spectrum processing gain of cells 503 using the same carrier frequencies F1, F2 or F3.

Preferred embodiments of the FIG. 2 and FIG. 12 transceivers are advantageously deployed in a time division multiple access (TDMA) communication system, which may also make use of frequency division multiple access (FDMA) or other multiplexing techniques. In a preferred embodiment, the FIG. 2 transceiver operates according to an over-air protocol for communication between a base station 504 and a user station 502, in which transmission is time-division duplex between the base station 504 and the user station 502 in a single frame, and is time-division multiplexed among multiple user stations 502 in a repeated pattern of frames such as described with respect to FIGS. 11A–11D previously herein. Other and further details regarding a preferred over-air communication protocol may be found in U.S. Pat. No. 5,455,822, and U.S. patent application Ser. Nos. 08/215,306, and 08/284,053 cited above. However, embodiments of the present invention will work in a variety of different communication environments, cellular or otherwise, and according to a variety of different protocols, whether or not such protocols make use of time-division duplexing or time-division multiplexing.

Table 15-1 shows a presently preferred set of 32 symbol codes. In a preferred embodiment, the symbol table 210 is configured to generate a sequence of symbol codes selected from the set of 32 symbol codes shown in Table 15-1, in response to a data signal 203.

TABLE 15-1

| Symbol | Symbol Code (Hex) | Symbol | Symbol Code (Hex) |
|---|---|---|---|
| 00 | 0544D65E | 10 | 0E4424A1 |
| 01 | 5B118E0B | 11 | 5B1171F4 |
| 02 | 3D77E66D | 12 | 3D771792 |
| 03 | 6822BD36 | 13 | 682242C7 |
| 04 | 014BD451 | 14 | 014B2BAE |
| 05 | 541E8104 | 15 | 541E7EFB |
| 06 | 3278E762 | 16 | 3278189D |
| 07 | 672DB237 | 17 | 672D4DC8 |
| 08 | 0EBBDBA1 | 18 | 0EBB245E |
| 09 | 5BEE8EF4 | 19 | 5BEE710B |
| 0A | 3D88E892 | 1A | 3D86176D |
| 0B | 68DDBDC7 | 1B | 68DD4238 |
| 0C | 01B4D4AE | 1C | 01B42B51 |
| 0D | 54E181FB | 1D | 54E17ED4 |
| 0E | 3287E79D | 1E | 32671862 |
| 0F | 67D2B2C8 | 1F | 67D24D37 |

While a TDD or TDMA timing structure is not required for operation of the invention, it is preferred because such a structure in certain configurations provides opportunities for the correlator 240 to have an inactive period or dead time during which it may be used to provide useful feedback information so as to allow adjustment of the transmitter's modulation index. The preferred embodiment of the FIG. 2 transceiver may be used in either a base station 504 or a user station 502. In a preferred embodiment, the transceiver transmits a CPM signal during its transmission portion of a time slot, and receives a signal during a reception portion of a time slot. Because the correlator 240 ordinarily used for reception is usually inactive during the transmission portion of each time slot, the correlator 240, as noted, may be used to monitor the output of the FM modulator 226 during the transmission portion and provide correlation feedback for adjusting the modulation index.

Alternative Embodiments

The present invention has been set forth in the form of its preferred embodiments. It is nevertheless intended that modifications to the disclosed waveform generation techniques may be made by those skilled in the art without departing from the scope and spirit of the present invention. Moreover, such modifications are considered to be within the purview of the appended claims.

Figure 13:
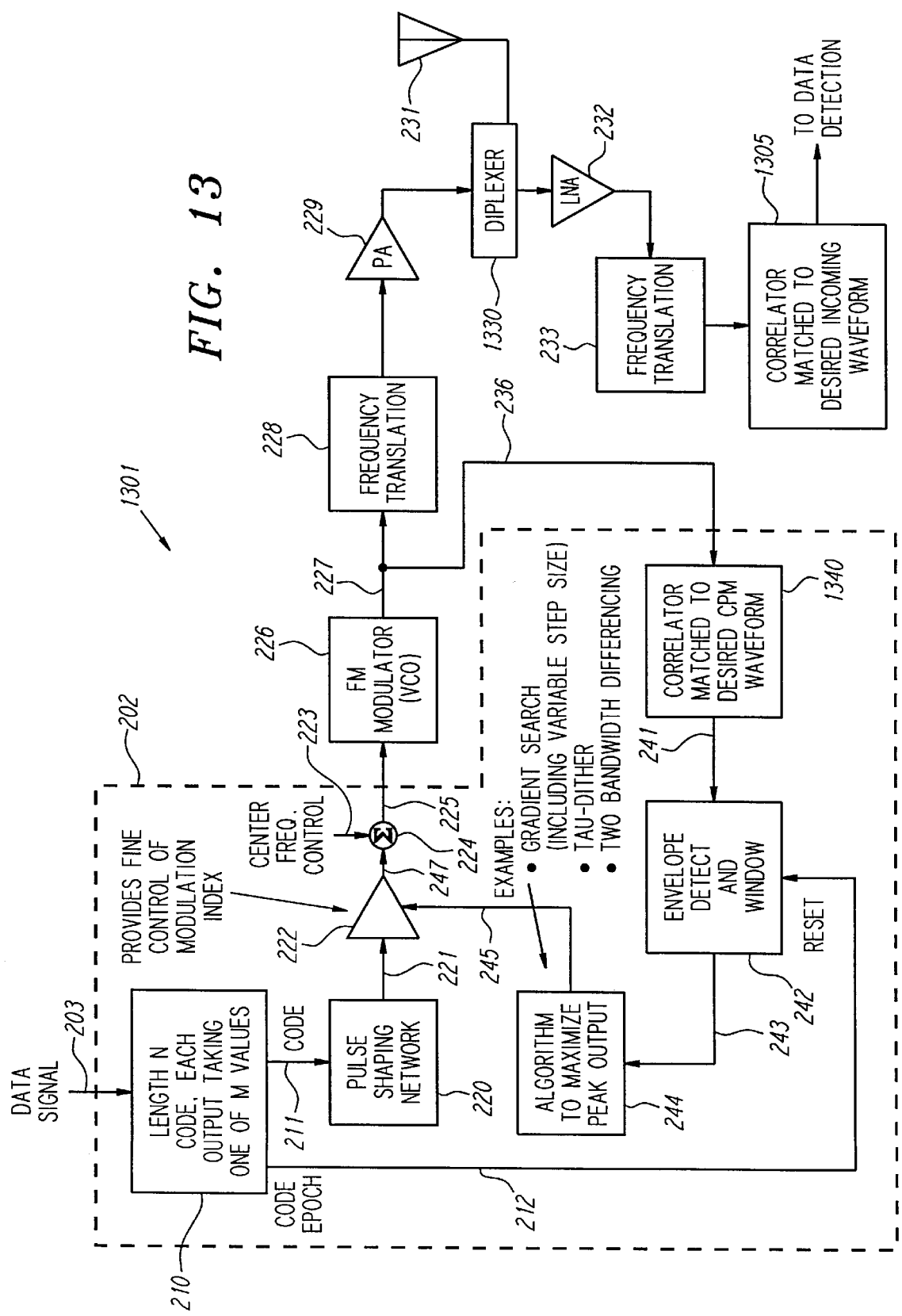
FIG. 13 is an alternative embodiment of a CPM transceiver allowing simultaneous transmission and reception of signals over different frequencies while controlling the modulation index of the transmitted signals.

For example, the transceiver of FIG. 2 may be modified, as shown in FIG. 13, so that it can transmit and receive signals over different frequencies at the same time. Rather than using the correlator 240 of FIG. 2 to receive and process incoming signals, a dedicated correlator 1305 is used to receive and process the incoming signals over a first frequency, while the transceiver may transmit over a second frequency. A second dedicated correlator 1340 is used solely to monitor the modulated signal and provide feedback to the feedback control circuit 244 to allow adjustment of the CPM modulation index in a manner as previously described. Because the FIG. 13 transceiver can both transmit and receive simultaneously, the transmit/receive duplex switch 230 is replaced with a diplexer 1330. Also, mode control signal 235 and switch 234 are eliminated in the FIG. 13 embodiment.

Figure 14:
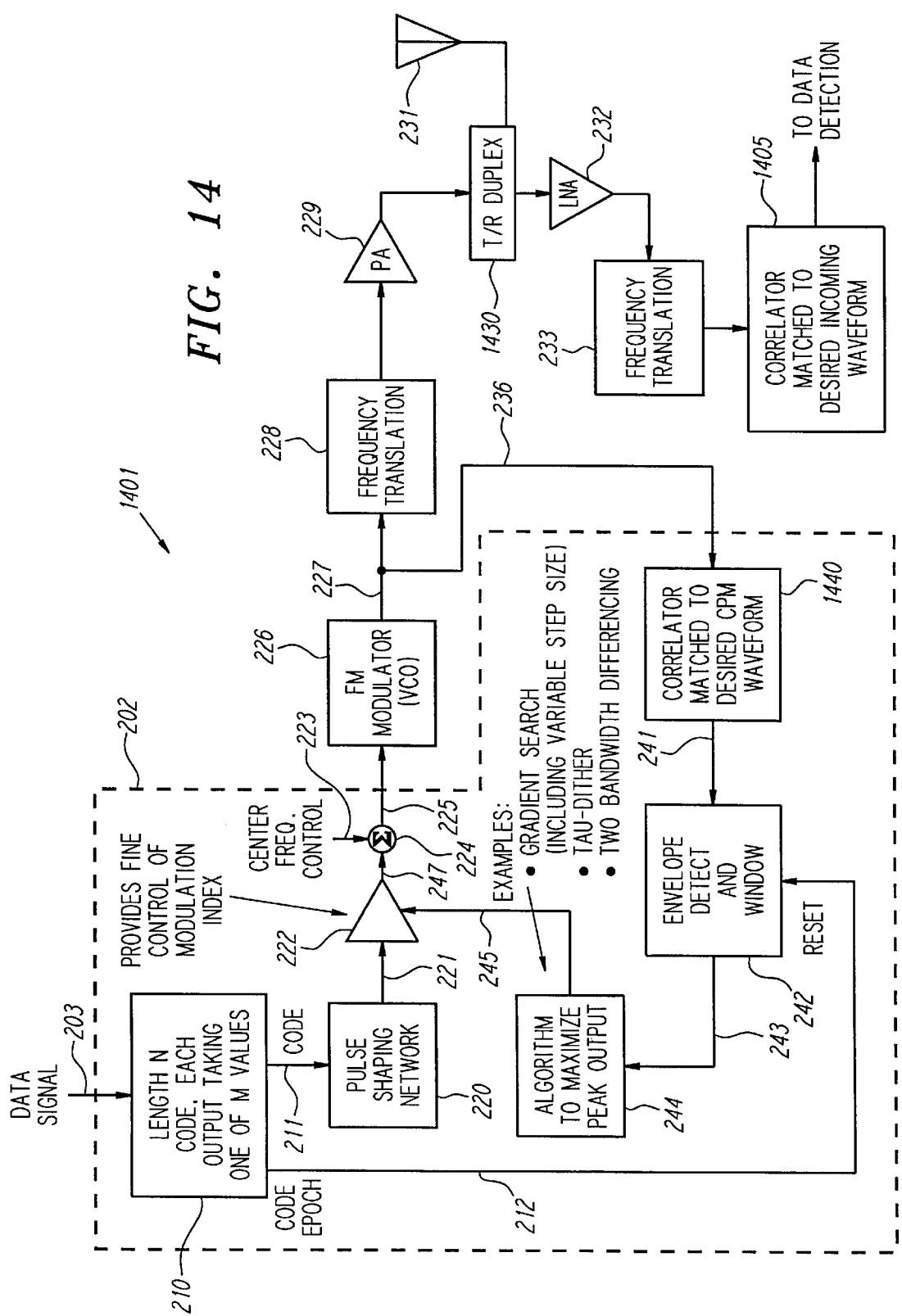
FIG. 14 is another alternative embodiment of a CPM transceiver allowing adjustment or tuning of the modulation index while the transceiver is in a receive mode.

In another alternative embodiment, the transceiver of FIG. 13 is modified, as shown in FIG. 14, so that it transmits and receives signals over the same frequency, but tunes the modulation index only while receiving incoming signals. Rather than using a diplexer 1330, the FIG. 14 embodiment uses a transmit/receive duplex switch 1430 such as shown in FIG. 2 and described previously in reference thereto. A dedicated correlator 1405 is used to receive and process the incoming signals during a transmit mode of, e.g., a TDD communication system. A second dedicated correlator 1440 is used solely for monitoring and tuning the modulation index, by techniques such as previously described herein, while the FIG. 14 transceiver is in receive mode. The transmitter is tuned by sending several dummy symbol codes with the transmitter's power amp 229 snubbed (i.e., shorted to ground) or turned off. When the FIG. 14 transceiver switches to transmit mode, the modulation index is properly tuned. A possible drawback of this approach may be undesired interference with the receiver portion of the transceiver during the receive mode.

Figure 15:
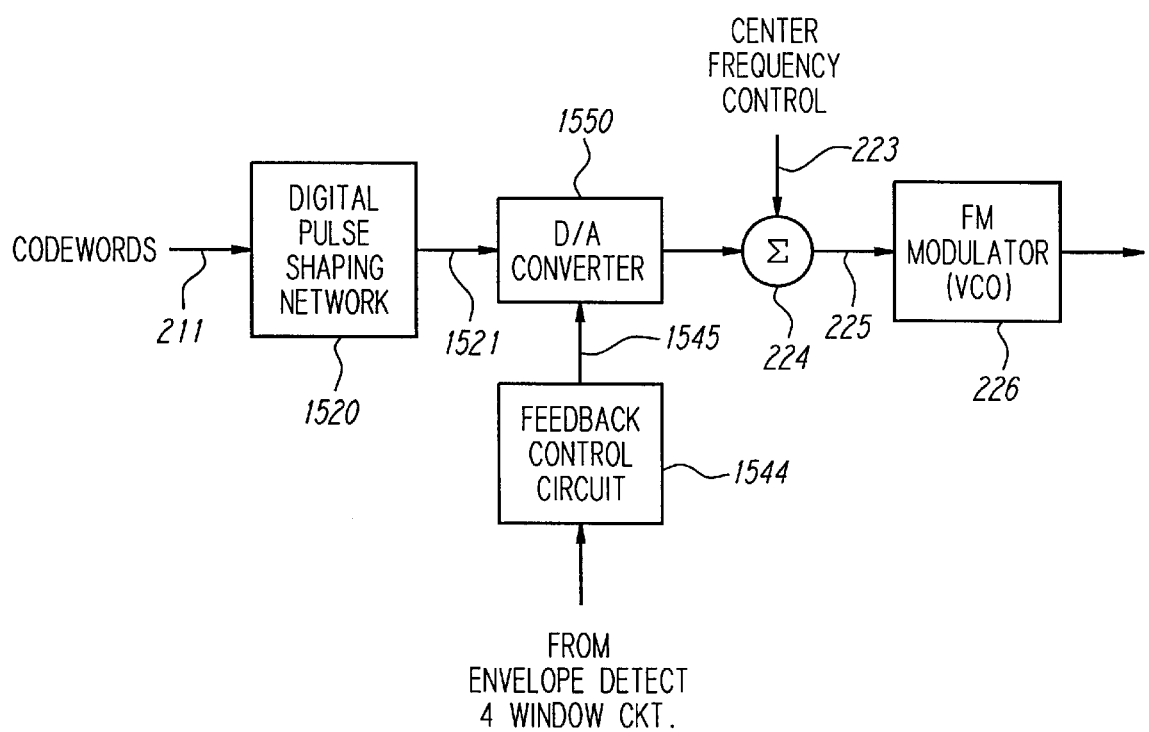
FIG. 15 is a block diagram showing an alternative embodiment of a portion of the FIG. 2 transceiver using a digital-to-analog converter with a variable gain control signal input to allow adjustment of the modulation index.

In another alternative embodiment, as illustrated in FIG. 15, the variable gain amplifier 222 is implemented in the digital domain by combining it with the pulse shaping network circuitry. FIG. 15 is a block diagram of a portion of the FIG. 2 transceiver, wherein similar features are numbered in a like manner to FIG. 2. Signal 211 output from the symbol table 210 (see FIG. 2) is connected to a digital pulse shaping network 1520, such as may be constructed using an FIR filtering technique as known in the art. An output 1521 from the digital pulse shaping network 1520 is connected to a digital-to-analog (D/A) converter 1550. The D/A converter 1550 is of the type known in the art having an adjustable "gain" input, whereby a gain control signal applied to the input causes a proportional change in the output of the D/A converter 1550. The feedback control circuit 1544 (corresponding to feedback control circuit 244 in FIG. 2) outputs a digital gain control signal 1545 to the D/A converter 1550.

In operation, the feedback control circuit 1544 derives a modulation index adjustment command using any of the techniques described previously herein, but preferably a digital technique, such as a second order tracking filter implemented in the digital domain. Rather than issuing a gain adjustment command to the variable gain amplifier 222, the feedback control circuit 1544 of FIG. 15 issues a digital gain control signal 1545 to the D/A converter 1550, whereby the gain of the D/A converter 1550 is adjusted so as to effectuate an adjustment of the modulation index.

In another alternative embodiment, the correlator 240 such as shown in the FIG. 2 transceiver is implemented using an M-ary surface-acoustical-wave (SAW) device such as described, for example, in U.S. patent application Ser. No. 08/383,518 entitled "Spread Spectrum Correlation Using SAW Device," filed in the name of the same inventor as the present application, and incorporated by reference previously herein. The M-ary SAW device of that application is capable of recognizing a plurality of spread spectrum symbol codes using, for example, a single SAW device. One advantage of such an M-ary SAW device is that it is capable of correlating to a variety of complex waveforms, including various types of continuous phase modulated waveforms.

In a particular embodiment using the M-ary SAW device referred to in the preceding paragraph, a selected symbol of M different symbols is periodically inserted in the transmission sequence. During the transmission mode, the feedback control circuit 244 observes only the output from the correlator 240 corresponding to the selected symbol, and uses that particular correlator output to dynamically adjust the modulation index. The selected symbol may be inserted at regular intervals in the transmission sequence, or may be inserted at irregular intervals provided that a sufficient percentage of the selected symbol appears in order to make meaningful adjustments to the modulation index during transmission. A receiver at the receiving end of the channel interprets the selected symbol as a tuning symbol, and thus as lacking in information content. The receiver therefore ignores the selected symbol appearing in the received signal.

In an alternative embodiment using the M-ary SAW device referred to in the preceding paragraphs, several symbols are used exclusively for training algorithms to provide tuning of the modulation index. The feedback control circuit 244 observes the output from the correlator 240 relating only to those symbols used for tuning of the modulation index, and thereby provides adjustment of the modulation index prior to or during transmission by the transceiver.

Other modifications and variations will be apparent to those skilled in the art, and it is understood that the scope of the invention is not to be limited by the specific embodiments disclosed herein, but only by the appended claims.

What is claimed is:

1. A method for controlling a modulation index of a signal, said method comprising the steps of receiving a data signal, generating a pulse shaped signal in response to said data signal, said pulse shaped signal associated with a continuous phase modulated waveform, applying said pulse shaped signal to a frequency modulator, and generating a modulated signal thereby, correlating said modulated signal, and generating a correlation signal in response thereto, and amplifying said pulse shaped signal in dependence upon said correlation signal.

2. The method of claim 1 further comprising the step of encoding said data signal prior to generating said pulse shaped waveform.

3. The method of claim 2 wherein said step of encoding comprises the step of spread spectrum encoding said data signal.

4. The method of claim 3 wherein said step of spread spectrum encoding comprises the step of selecting one of a plurality of spread spectrum codes in response to a pattern of data bits in said data signal.

5. The method of claim 1 wherein said step of amplifying said pulse shaped signal comprises the steps of tracking said correlation signal and adjusting a level of gain of an amplifier in response to changes in said correlation signal.

6. The method of claim 5 wherein said step of tracking said correlation signal is carried out using a second order tracker.

7. The method of claim 1 wherein said step of amplifying said pulse shaped signal comprises the steps of determining a rate of change of the correlation signal, and adjusting a level of gain of an amplifier in response to said rate of change.

8. The method of claim 7 wherein said step of determining said rate of change is carried out using a gradient search technique.

9. The method of claim 8 wherein said gradient search technique comprises a steepest descent processing technique.

10. The method of claim 1 wherein said step of amplifying said pulse shaped signal comprises the steps of
filtering said correlation signal with a first filter to generate a fast response signal,
filtering said correlation signal with a second filter to generate a slow response signal, and
adjusting a level of gain of an amplifier in response to said fast response signal and said slow response signal.

11. The method of claim 10 wherein said first filter comprises a wideband filter, and said second filter comprises a narrowband filter.

12. The method of claim 11 wherein said first filter and said second filter are low pass filters.

13. The method of claim 1 further comprising the step of controlling a center frequency of said pulse shaped signal.

14. The method of claim 1 wherein said step of correlating said modulated signal comprises the step of correlating said modulated signal using an M-ary surface-acoustical wave device.

15. The method of claim 1 wherein said steps of correlating said modulated signal, generating said correlation signal in response thereto, and amplifying said pulse shaped signal in dependence upon said correlation signal are carried out during a designated mode of operation within a time division multiple access communication system.

16. The method of claim 15 wherein said designated mode comprises a modulation index adaptation mode.

17. The method of claim 15 wherein said designated mode comprises a transmit mode.

18. Apparatus for adjusting a modulation index of a transmitter generating a signal having a nominally constant signal envelope, said apparatus comprising
means for receiving a data signal,
means for encoding said data signal and generating an encoded signal thereby,
a pulse shaping network connected to said encoded signal,
a variable gain amplifier connected to an output of said pulse shaping network,
a voltage-controlled oscillator connected to an output of said variable gain amplifier,
a coupler connected to an output of said voltage-controlled oscillator,
a correlator connected to said coupler, said correlator outputting a correlation signal,
a feedback control circuit connected to said correlation signal, and
a gain adjustment command signal output from said feedback control circuit to said variable gain amplifier, whereby a gain of said variable gain amplifier is adjusted in response to said gain adjustment command signal.

19. The apparatus of claim 18 further comprising
a power amplifier connected to the output of said voltage-controlled oscillator,
an antenna,
a receiving amplifier,
a first switch connected to an output of said power amplifier, to an output of said receiving amplifier, and to said antenna, whereby, in a first mode, signals to be transmitted are coupled by said first switch from said power amplifier to said antenna, and, in a second mode, received signals are coupled by said first switch from said antenna to said receiving amplifier, and
a second switch, whereby in said first mode said signals to be transmitted are coupled by said second switch to said correlator, and in said second mode said received signals are coupled by said second switch to said correlator.

20. The apparatus of claim 19 wherein said first mode comprises a transmit mode, and said second mode comprises a receive mode.

21. The apparatus of claim 19 wherein said first mode comprises a modulation index adaptation mode, and said second mode comprises a receive mode.

22. The apparatus of claim 18 wherein said means for encoding comprises a lookup table comprising a plurality of spread spectrum codes, whereby a pattern of data bits in said data signal is used for addressing said lookup table and selecting a particular one of said spread spectrum codes thereby.

23. The apparatus of claim 22 wherein a number of spread spectrum codes fewer than all of said plurality of spread spectrum codes is used for adjusting the modulation index of said apparatus.

24. The apparatus of claim 18 further comprising center frequency controlling means positioned between the output of said variable gain amplifier and an input of said voltage-controlled oscillator.

25. The apparatus of claim 18 wherein said feedback control circuit comprises a tracking circuit.

26. The apparatus of claim 26 wherein said tracking circuit comprises a second-order tracker.

27. The apparatus of claim 18 wherein said feedback control circuit comprises a gradient search processor.

28. The apparatus of claim 18 wherein said feedback control circuit comprises a first filter having a relatively slow transient response and a second filter having a relatively fast transient response.

29. The apparatus of claim 28 wherein said feedback control circuit comprises a two-bandwidth differencing circuit.

30. The apparatus of claim 18 wherein said correlator comprises an M-ary surface-acoustical-wave device.

31. A method for controlling a modulation index of a signal, comprising the steps of
receiving a data signal,
generating a pre-modulation signal in response to said data signal,
amplifying said pre-modulation signal by a gain amount,
applying said amplified pre-modulation signal to a voltage controlled oscillator, and generating a modulated signal thereby,
correlating said modulated signal, and generating a correlation signal in response thereto, and
adjusting said gain amount in response to said correlation signal.

32. The method of claim 31 further comprising the step of encoding said data signal prior to generating said pre-modulation signal.

33. The method of claim 32 wherein said step of encoding comprises the step of spread spectrum encoding said data signal.

34. The method of claim 33 wherein said step of spread spectrum encoding comprises the step of selecting one of a plurality of spread spectrum codes in response to a pattern of data bits in said data signal.

35. The method of claim 31 wherein said pre-modulation signal is associated with a continuous phase modulated waveform.

36. The method of claim 31 wherein said step of adjusting said gain amount comprises the steps of
   temporarily increasing said gain amount,
   measuring a first correlation value from said correlation signal,
   temporarily decreasing said gain amount,
   measuring a second correlation value from said correlation signal,
   measuring a difference between said first correlation value and said second correlation value, and
   generating a gain adjustment command in response to said difference.

37. The method of claim 31 wherein said step of adjusting said gain amount is carried out by applying a tau dither technique.

38. The method of claim 31 wherein said step of adjusting said gain amount comprises the steps of determining a rate of change of said correlation signal, and generating a gain adjustment command in response to said rate of change.

39. The method of claim 38 wherein said step of determining said rate of change is carried out using a gradient search technique.

40. The method of claim 31 wherein said step of adjusting said gain amount is carried out by applying a two bandwidth differencing technique.

41. The method of claim 31 wherein said step of adjusting said gain amount comprises the steps of
   temporarily adjusting said gain amount by a predetermined amount,
   filtering said correlation signal to obtain a slow response measurement signal,
   filtering said correlation signal to obtain a fast response measurement signal, and
   generating a gain adjustment command in response to said slow response measurement signal and said fast response measurement signal.

42. The method of claim 41 wherein said slow response measurement signal is obtained by filtering said correlation signal with a narrowband filter, and said fast response measurement signal is obtained by filtering said correlation signal with a wideband filter.

43. The method of claim 42 wherein said wideband filter and said narrowband filter are single-pole low pass filters.

44. The method of claim 31 wherein said steps of correlating said modulated signal, generating a correlation signal in response thereto, and adjusting said gain amount in response to said correlation signal are carried out only during a non-receive mode of a transceiver operating in a time division duplex communication system.

45. The method of claim 31 wherein said steps of correlating said modulated signal, generating a correlation signal in response thereto, and adjusting said gain amount in response to said correlation signal are carried out only during a modulation index adaptation mode of a transceiver operating in a time division duplex communication system, said modulation index adaptation mode distinct from a transmit mode and a receive mode of said transceiver.

46. A method for controlling a modulation index of a signal, comprising the steps of
   receiving a data signal and generating a pre-modulation signal in response thereto, said pre-modulation signal associated with a continuous phase modulated waveform,
   frequency modulating said pre-modulation signal, and generating a modulated signal thereby,
   correlating said modulated signal, and generating a feedback correlation signal in response thereto, and
   adjusting an amplitude of said pre-modulation signal in response to said feedback correlation signal.

47. The method of claim 46 wherein said pre-modulation signal is generated by a pulse shaping network.

48. The method of claim 46 wherein said step of adjusting an amplitude of said pre-modulation signal is accomplished by applying a tau-dither technique, said tau-dither technique using said feedback correlation signal as an input.

49. The method of claim 46 wherein said step of adjusting an amplitude of said pre-modulation signal is carried out by applying a gradient search technique.

50. The method of claim 46 wherein said step of adjusting an amplitude of said pre-modulation signal is carried out by applying a two-bandwidth differencing technique.

51. The method of claim 46 wherein said steps of correlating said modulated signal, generating a feedback correlation signal in response thereto, and adjusting an amplitude of said pre-modulation signal are carried out only during a rate adaptation interval of a transceiver operating in a time division duplex communication system.

* * * * *